(12) United States Patent
Tachibanada et al.

(10) Patent No.: US 10,563,679 B2
(45) Date of Patent: Feb. 18, 2020

(54) HYDRAULIC PRESSURE CONTROL DEVICE

(71) Applicant: Honda Motor Co., Ltd., Tokyo (JP)

(72) Inventors: Yuya Tachibanada, Saitama (JP);
Yutaka Ishikawa, Saitama (JP);
Yusuke Yoshimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 15/925,777

(22) Filed: Mar. 20, 2018

(65) Prior Publication Data

US 2018/0283419 A1    Oct. 4, 2018

(30) Foreign Application Priority Data

Mar. 29, 2017  (JP) ................. 2017-065564

(51) Int. Cl.
*F15B 20/00* (2006.01)
*F15B 15/14* (2006.01)
(Continued)

(52) U.S. Cl.
CPC ............ *F15B 20/008* (2013.01); *F15B 15/14* (2013.01); *F15B 19/005* (2013.01); *F16D 41/125* (2013.01); *F16D 41/16* (2013.01); *F15B 2211/3057* (2013.01); *F15B 2211/6336* (2013.01); *F15B 2211/87* (2013.01);
(Continued)

(58) Field of Classification Search
CPC ...... F15B 20/008; F15B 15/14; F15B 19/005; F15B 2211/2057; F15B 2211/6336; F15B 2211/87; F15B 2211/8757; F16D 41/125; F16D 41/16; F16H 3/66; F16H 61/0206; F16H 63/3483; F16H 2200/0069; F16H 2200/2012; F16H 2200/2046;
(Continued)

(56) References Cited

U.S. PATENT DOCUMENTS 5,888,169 A * 3/1999 Jang .................. F16H 61/061
                                                      477/130
5,916,060 A * 6/1999 Jang .................. F16H 61/0206
                                                      477/155
(Continued)

FOREIGN PATENT DOCUMENTS

CN   103492210   1/2014
CN   104033590   9/2014
(Continued)

OTHER PUBLICATIONS

"Office Action of China Counterpart Application," dated Jul. 9, 2019, with English translation thereof, p. 1-p. 9.

*Primary Examiner* — Tinh Dang
(74) *Attorney, Agent, or Firm* — JCIPRNET

(57) ABSTRACT

Provided is a hydraulic pressure control device. A hydraulic pressure control device supplies hydraulic pressure to a piston using solenoid valves and performs 2:1 switching processing of stopping the supply of hydraulic pressure to the piston using a solenoid valve when the piston is switched to a parking locked state. When the piston is not switched to a side that is to be a parking locked state, hydraulic pressure is supplied to two solenoid valves, and 2:0 switching processing of stopping the supply of hydraulic pressure to the piston by solenoid valves is performed. Then, a reporting processing of reporting that at least one of the solenoid valves has failed is performed.

3 Claims, 10 Drawing Sheets

(51) Int. Cl.
*F15B 19/00* (2006.01)
*F16D 41/12* (2006.01)
*F16H 3/66* (2006.01)
*F16H 61/02* (2006.01)
*F16H 63/34* (2006.01)
*F16D 41/16* (2006.01)

(52) U.S. Cl.
CPC ......... *F15B 2211/8757* (2013.01); *F16H 3/66* (2013.01); *F16H 61/0206* (2013.01); *F16H 63/3483* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(58) Field of Classification Search
CPC ..... F16H 2200/2048; F16H 2200/2066; F16H 2200/2082
See application file for complete search history.

(56) References Cited

U.S. PATENT DOCUMENTS

| | | | |
|---|---|---|---|
| 9,250,632 B2 * | 2/2016 | Tondolo | G05D 7/0617 |
| 9,981,645 B2 * | 5/2018 | Kim | B60T 8/348 |
| 2001/0004621 A1 | 6/2001 | Suzuki et al. | |

FOREIGN PATENT DOCUMENTS

| | | |
|---|---|---|
| CN | 106062436 | 10/2016 |
| JP | 2015-048885 | 3/2015 |
| KR | 20070049727 | 5/2007 |

* cited by examiner

| | C1 | C2 | C3 | B1 | B2 | B3 | F1 | Gear ratio | Common ratio |
|---|---|---|---|---|---|---|---|---|---|
| Rvs | | | ○ | | ○ | | L | 4.008 | |
| 1st | | | | ○ | (○) | | R/L | 5.233 | |
| 2nd | | ○ | | ○ | ○ | | R | 3.367 | 1.554 |
| 3rd | | | ○ | ○ | ○ | | R | 2.298 | 1.465 |
| 4th | | ○ | ○ | ○ | | | R | 1.705 | 1.348 |
| 5th | ○ | | (○) | ○ | | | R | 1.363 | 1.251 |
| 6th | ○ | ○ | ○ | | | | R | 1.000 | 1.363 |
| 7th | ○ | | ○ | | ○ | | R | 0.786 | 1.273 |
| 8th | ○ | ○ | | | ○ | | R | 0.657 | 1.196 |
| 9th | ○ | | | | ○ | ○ | R | 0.584 | 1.126 |
| 10th | ○ | ○ | | | | ○ | R | 0.520 | 1.120 |

| | normal | | pressing to P-side | | | | pressing to not P-side | | | |
|---|---|---|---|---|---|---|---|---|---|---|
| | | | solenoid valve | | oil chamber | | solenoid valve | | oil chamber | |
| | target | range | 122E | 122C | 112B | 112A | 122F | 122D | 114A | 114B |
| (1) | P | P | O | × | O | O | × | × | × | × |
| (2) | | D/R →P | O | × | O | O | × | O | × | O |
| (3) | notP | D/R | × | O/× LC control | × | O/× LC control | O | O | O | O |
| (4) | | P→ D/R | × | × | × | O | O | O | O | O |
| | breakdown | | pressing to P-side | | | | pressing to not P-side | | | |
| | | | solenoid valve | | oil chamber | | solenoid valve | | oil chamber | |
| | target | range | 122E | 122C | 112B | 112A | 122F | 122D | 114A | 114B |
| (5) | P | P | O | × | O | O | × | × | × | × |
| (6) | | D/R →P | O | × | O | O | × | × | × | × |
| (7) | notP | D/R | × | O/× LC control | × | O/× LC control | O | O | O | O |
| (8) | | P→ D/R | × | O | × | × | O | O | O | O |

※ "O" of solenoid valve shows hydraulic pressure supply state, and "X" shows hydraulic pressure stoppage state.

"O" of oil chamber shows state in which hydraulic pressure is supplied, and "X" shows state in which hydraulic pressure is not supplied.

FIG. 11

HYDRAULIC PRESSURE CONTROL DEVICE

CROSS-REFERENCE TO RELATED APPLICATION

This application claims the priority of Japan patent application serial no. 2017-065564, filed on Mar. 29, 2017. The entirety of the above-mentioned patent application is hereby incorporated by reference herein and made a part of this specification.

BACKGROUND

Technical Field

The disclosure relates to a hydraulic pressure control device configured to control hydraulic pressure of a transmission.

Description of Related Art

In the related art, a hydraulic pressure control device configured to control a multi-plate frictional clutch or the like of an automatic transmission using a working oil pressure (for example, see Patent Document 1: Japanese Patent Application Laid-Open No. 2015-048885) is known.

In general, in an automatic transmission, a parking lock mechanism configured to prevent drive wheels from rotating such that they do not move during parking of a vehicle is installed. It is conceivable that the parking lock mechanism may also be controlled by a hydraulic pressure control device. Here, it is conceivable that a parking piston for a parking lock mechanism installed in a hydraulic pressure control device be switched by hydraulic pressure so as to switch between a parking locked state and a parking released state of the parking lock mechanism with the hydraulic pressure control device.

In addition, while it is considered that hydraulic pressure supplied from the parking piston is controlled by a control valve or the like installed on the hydraulic pressure control device and configured to control supply of hydraulic pressure, it is considered that two control valves configured to control hydraulic pressure on a parking locked side and two control valves configured to control hydraulic pressure on an unlocked side are provided such that the parking piston is switched even when the control valve has failed.

However, even if the two control valves on the parking locked side and the two control valves on the unlocked side are provided, when both of the control valves fail, the parking piston may not be switched. In addition, such a case is not limited to the parking lock mechanism and may be included similarly in switching the state using the piston.

SUMMARY

The embodiments of the invention are directed to provide a hydraulic pressure control device capable of preventing a piston from being unable to switch.

An embodiment of the invention provides a hydraulic pressure control device (for example, a hydraulic pressure control device (100) in the embodiment, the same below), comprising:

a piston (for example, a parking piston (54) or a two-way piston (212) in the embodiment, the same below) configured to switch between a first state (for example, any one of a parking locked state and a parking released state in the embodiment, or any one of a reverse rotation prevention state and a fixed state of a two-way clutch (F1) in the embodiment, the same below) and a second state (for example, the other one of the parking locked state and the parking released state in the embodiment, or the other one of the reverse rotation prevention state and the fixed state of the two-way clutch (F1) in the embodiment, the same below);

two control valves, which are a first control valve and a second control valve (for example, solenoid valves (122C, 122E) in the embodiment, the same below) configured to supply hydraulic pressure that presses the piston toward a first side that is to be the first state to the piston;

two control valves, which are a third control valve and a fourth control valve (for example, solenoid valves (122F, 122D) in the embodiment, the same below) configured to supply hydraulic pressure that presses the piston toward a second side that is to be the second state to the piston; and a control unit for example, a transmission control device (ECU) of the embodiment, the same below) configured to control the four control valves, which are the first to fourth control valves, wherein when a state is switched from the second state to the first state, the control unit performs 2:1 control processing (for example, 2:1 switching processing in the embodiment, the same below) to supply hydraulic pressure to the piston using the three control valves, which are the first to third control valves and to stop the fourth control valve to supply hydraulic pressure to the piston, and when the piston is not switched from the second side at which the piston is in the second state to the first side at which the piston is in the first state through the 2:1 control processing, the control unit performs 2:0 control processing (for example, 2:0 switching processing in the embodiment, the same below) to supply hydraulic pressure to the piston using the two control valves, which are the first and second control valves and to stop the two control valves, which are the third and fourth control valves to supply hydraulic pressure to the piston, and performs a reporting processing (for example, a reporting processing in the embodiment, the same below) of reporting that at least one of the four control device, which are the first to fourth control valves has failed.

BRIEF DESCRIPTION OF THE DRAWINGS

FIG. 11 is a view for describing operations upon processing of control units by relating supply of hydraulic pressure of a solenoid valve and the supply of hydraulic pressure to an oil chamber depending on when the solenoid valve of the embodiment is normal or breakdown.

DESCRIPTION OF THE EMBODIMENTS

According to the embodiments of the invention, when the piston is not switched from the second side at which the piston is in the second state to the first side in which the piston is in the first state by the 2:1 control processing, the reporting processing of reporting that at least one of the four control valves, which are the first to fourth control valves has failed is performed. Accordingly, according to the embodiments of the invention, a user (a driver) can be prompted to repair the control valve, and as the control valve, which has failed, is reported as it is, it is possible to prevent the other control valves from being failing and the piston from not being switched after that.

In addition, in one or some exemplary embodiments of the invention, the piston may be a parking piston (for example, a parking piston 54 in the embodiment, the same below) configured to switch between a parking locked state and a parking released state of a parking lock mechanism, and the first state may be one of the parking locked state (for example, a parking locked state in the embodiment, the same below) and the parking released state (for example, a parking released state in the embodiment, the same below), and the second state may be the other of the parking locked state and the parking released state. According to such a configuration as well, a user can be prompted to repair the control valve, and as the control valve, which is broken down, is reported as it is, it is possible to prevent the other control valves from failing and the parking piston from not being switched after that.

In addition, in one or some exemplary embodiments of the invention, the piston may be a two-way piston (for example, a two-way piston (212) in the embodiment, the same below) configured to switch between a reverse rotation prevention state (for example, a reverse rotation prevention state in the embodiment, the same below) and a fixed state (for example, a fixed state of the two-way clutch F1 in the embodiment, the same below) of the two-way clutch (for example, the two-way clutch F1 in the embodiment, the same below), and the first state may be one of the reverse rotation prevention state and the fixed state, and the second state may be the other of the reverse rotation prevention state and the fixed state. According to such a configuration as well, a user can be prompted to repair the control valve, and as the control valve, which has failed, is reported as it is, it is possible to prevent the other control valves from failing and the two-way piston from not being switched after that.

A transmission including a hydraulic pressure control device of embodiments and a vehicle on which the transmission is mounted will be described with reference to the accompanying drawings.

Figure 1:
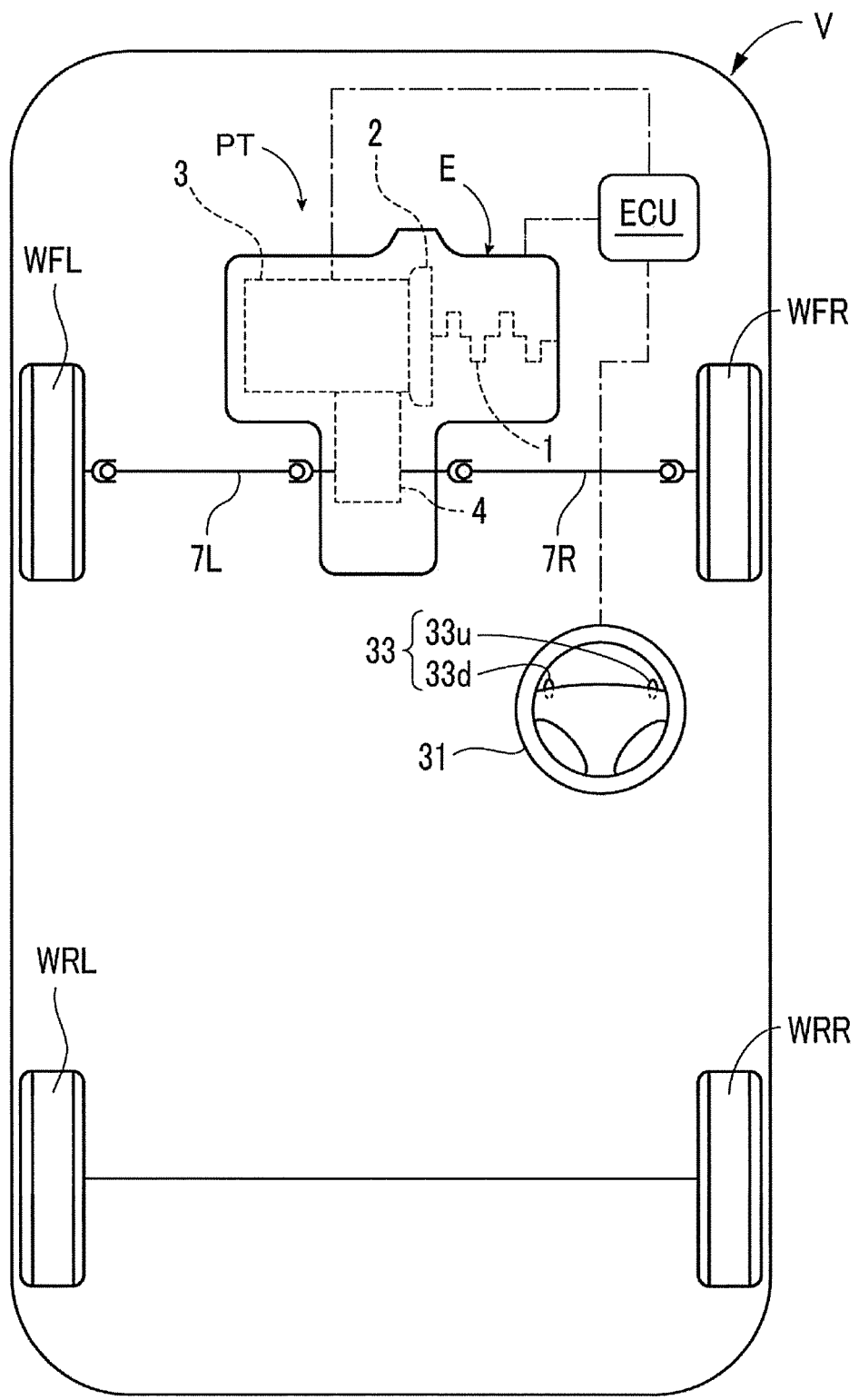
FIG. 1 is a view for schematically describing a vehicle on which a transmission including a hydraulic pressure control device of an embodiment is mounted.

As shown in FIG. 1, in a vehicle V on which a transmission including a hydraulic pressure control device of the embodiment is mounted, an engine E (an internal combustion engine, a drive source, an electric motor may be used instead of the engine) is laterally mounted in a vehicle body such that a crankshaft 1 is directed in a vehicle body leftward/rightward direction. A driving force output from the engine E is transmitted to a power transmission PT. Then, the power transmission PT adjusts a driving force of the engine E to correspond to a selected gear ratio, and transmits the adjusted driving force to the left and right front wheels WFL and WFR.

The power transmission PT is constituted by an automatic transmission 3 having a torque converter 2 connected to the crankshaft 1, and a front differential gear 4 connected to the automatic transmission 3.

The front differential gear 4 is connected to the left and right front wheels WFL and WFR via a front section left axle 7L and a front section right axle 7R.

Figure 2:
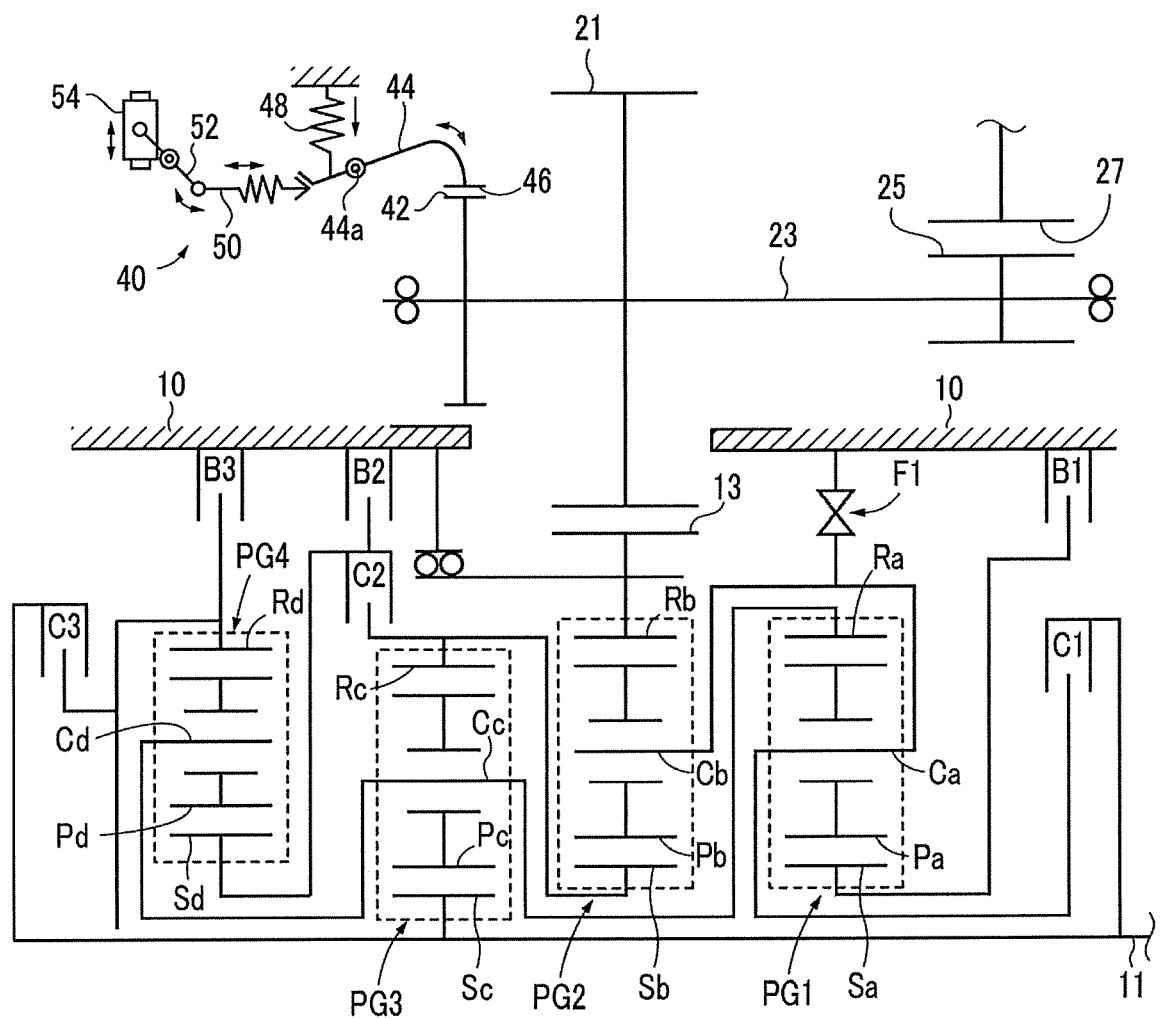
FIG. 2 is a skeleton view showing the transmission of the embodiment.

FIG. 2 is a skeleton view showing a portion of the automatic transmission 3 other than the torque converter 2. The automatic transmission 3 includes an input shaft 11 serving as an input member rotationally and axially supported in a transmission case 10 that is a housing and to which a driving force output from the engine E is transmitted via the torque converter 2 having a lock-up clutch and a damper, and an output member 13 disposed concentrically with the input shaft 11 and constituted by an output gear.

Rotation of the output member 13 is transmitted to left and right drive wheels (the front wheels WFL and WFR) of the vehicle via an idle gear 21 meshed with the output member 13, an idle shaft 23 configured to axially support the idle gear 21, a final drive gear 25 axially supported by the idle shaft 23, and the front differential gear 4 including a final driven gear 27 meshed with the final drive gear 25. Further, a single disk type or a multi-disk type departure clutch that is frictionally engageably configured may be installed instead of the torque converter 2. In addition, a propeller shaft may be connected instead of the front differential gear 4 and applied to a rear wheel drive vehicle. In addition, the propeller shaft may be connected to the front differential gear 4 via a transfer and applied to a four-wheel drive vehicle.

In addition, the automatic transmission 3 of the embodiment includes a parking lock mechanism 40. A parking gear 42 of the parking lock mechanism 40 is fixed to the idle shaft 23 to be integrally rotated therewith. A parking pawl 44 pivoted in a spindle 44a is disposed in the vicinity of the parking gear 42. A locking claw 46 is formed on an end portion of the parking pawl 44 close to the parking gear 42. When the locking claw 46 is engaged with the parking gear 42, the parking gear reaches a state in which the drive wheels (the front wheels WFL and WFR) are not rotatable via the idle shaft 23 (a parking locked state). The parking pawl 44 is biased by a detachment spring 48 in a direction in which the locking claw 46 disengages from the parking gear 42.

A cam 50 is disposed on the other end of the parking pawl 44 and freely advances and retreats. When the cam 50 advances, the parking pawl 44 swings against a biasing force of the detachment spring 48, and the locking claw 46 is engaged with the parking gear 42. When the cam 50 retreats, the parking pawl 44 is returned to an original position by the biasing force of the detachment spring 48, and engagement between the locking claw 46 and the parking gear 42 is released.

A parking piston 54 is connected to the cam 50 via a link 52. The parking piston 54 is configured to be freely moved by hydraulic pressure in an axial direction thereof. Thus, as the parking piston 54 moves in the axial direction, the cam 50 is configured to advance or retreat via the link 52.

Four planetary gear mechanisms, which are the first to fourth planetary gear mechanisms PG1 to PG4, are disposed in the transmission case 10 serving as a housing in sequence from the drive source ENG side concentrically with the input shaft 11.

The first planetary gear mechanism PG1 is configured by a so-called single pinion type planetary gear mechanism constituted by a sun gear Sa, a ring gear Ra, and a carrier Ca configured to axially support a pinion Pa meshed with the sun gear Sa and the ring gear Ra freely rotatably and revolvingly.

The so-called single pinion type planetary gear mechanism is also referred to as a minus planetary gear mechanism or a negative planetary gear mechanism because the ring gear and the sun gear are rotated in different directions when the carrier is fixed and the sun gear is rotated. Further, in the so-called single pinion type planetary gear mechanism, when the ring gear is fixed and sun gear is rotated, the carrier and the sun gear are rotated in the same direction.

Figure 3:
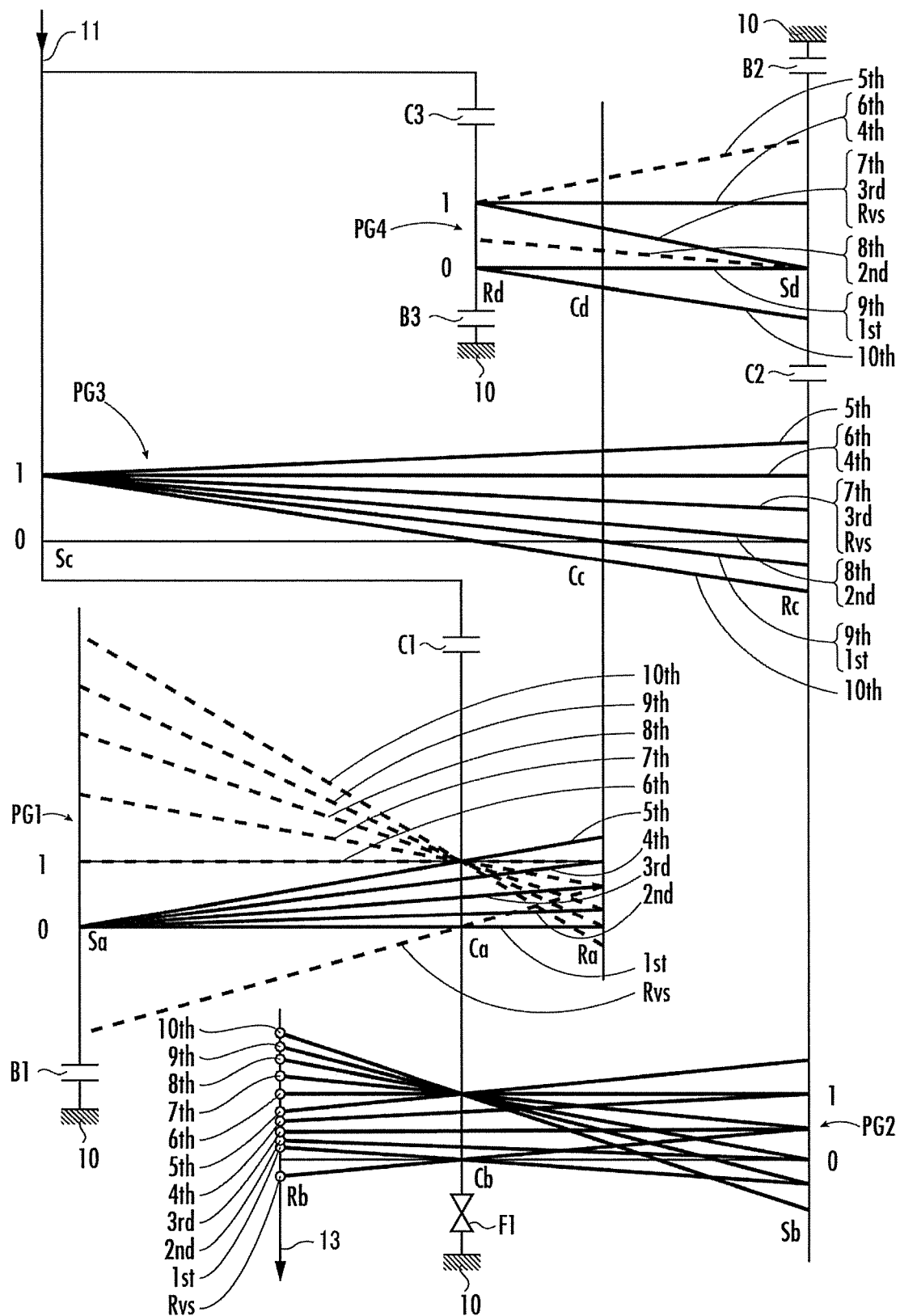
FIG. 3 is a co-diagram of a planetary gear mechanism of the embodiment.

When the three elements Sa, Ca and Ra of the first planetary gear mechanism PG1 are set as a seventh element, an eighth element and a ninth element at intervals corresponding to gear ratios in an alignment diagram in an arrangement order from a left side with reference to the alignment diagram of the first planetary gear mechanism PG1 shown in a third stage from the top in FIG. 3, the seventh element is the sun gear Sa, the eighth element is the carrier Ca, and the ninth element is the ring gear Ra. A ratio between an interval between the sun gear Sa and the carrier Ca and an interval between the carrier Ca and the ring gear Ra is set to h:1 when a gear ratio of the first planetary gear mechanism PG1 is h.

The second planetary gear mechanism PG2 is also configured by a so-called single pinion type planetary gear mechanism constituted by a sun gear Sb, a ring gear Rb, and a carrier Cb configured to axially support a pinion Pb meshed with the sun gear Sb and the ring gear Rb freely rotatably and revolvingly.

When the three elements Sb, Cb and Rb of the second planetary gear mechanism PG2 are set as a tenth element, an eleventh element and a twelfth element at intervals corresponding to gear ratios in an alignment diagram in an arrangement order from a left side with reference to the alignment diagram of the second planetary gear mechanism PG2 shown in a fourth stage (the lowermost stage) from the top in FIG. 3, the tenth element is the ring gear Rb, the eleventh element is the carrier Cb, and the twelfth element is the sun gear Sb. A ratio between an interval between the sun gear Sb and the carrier Cb and an interval between the carrier Cb and the ring gear Rb is set to i:1 when a gear ratio of the second planetary gear mechanism PG2 is i.

The third planetary gear mechanism PG3 is configured by a so-called single pinion type planetary gear mechanism constituted by a sun gear Sc, a ring gear Rc, and a carrier Cc configured to axially support a pinion Pc meshed with the sun gear Sc and the ring gear Re freely rotatably and revolvingly.

When the three elements Sc, Cc and Rc of the third planetary gear mechanism PG3 are set as a first element, a second element and a third element at intervals corresponding to gear ratios in an alignment diagram (the number of teeth of the ring gear/the number of teeth of the sun gear) in an arrangement order from a left side with reference to the alignment diagram of the third planetary gear mechanism PG3 shown in a second stage from the top in FIG. 3 (a view in which a ratio between relative rotational speeds of three elements including the sun gear, the carrier and the ring gear is represented by straight lines (speed lines)), the first element is the sun gear Sc, the second element is the carrier Cc, and the third element is the ring gear Re.

Here, a ratio between an interval between the sun gear Sc and the carrier Cc and an interval between the carrier Cc and the ring gear Rc is set to j:1 when a gear ratio of the third planetary gear mechanism PG3 is j. Further, in the alignment diagram, a lower horizontal line and an upper horizontal line (overlapping $4^{th}$ and $6^{th}$ lines) show that rotational speeds are "0" and "1" (the same rotational speed as that of the input shaft 11).

The fourth planetary gear mechanism PG4 is also configured by a so-called single pinion type planetary gear mechanism constituted by a sun gear Sd, a ring gear Rd, and a carrier Cd configured to axially support a pinion Pd meshed with the sun gear Sd and the ring gear Rd to freely rotate and revolve.

When the three elements Sd, Cd and Rd of the fourth planetary gear mechanism PG4 are set as a fourth element, a fifth element and a sixth element at intervals corresponding to gear ratios in an alignment diagram in sequence from a left side with reference to the alignment diagram of the fourth planetary gear mechanism PG4 shown in a first stage (the uppermost stage) from the top in FIG. 3, the fourth element is the ring gear Rd, the fifth element is the carrier Cd, and the sixth element is the sun gear Sd. A ratio between an interval between the sun gear Sd and the carrier Cd and an interval between the carrier Cd and the ring gear Rd is set to k:1 when a gear ratio of the fourth planetary gear mechanism PG4 is k.

The sun gear Sc (the first element) of the third planetary gear mechanism PG3 is connected to the input shaft 11. In addition, the ring gear Rb (the tenth element) of the second planetary gear mechanism PG2 is connected to the output member 13 constituted by an output gear.

In addition, the carrier Cc (the second element) of the third planetary gear mechanism PG3, the carrier Cd (the fifth element) of the fourth planetary gear mechanism PG4 and the ring gear Ra (the ninth element) of the first planetary gear mechanism PG1 are connected to constitute a first connecting body Cc-Cd-Ra. In addition, the ring gear Rc (the third element) of the third planetary gear mechanism PG3 and the sun gear Sb (the twelfth element) of the second planetary gear mechanism PG2 are connected to constitute a second connecting body Rc-Sb. In addition, the carrier Ca (the eighth element) of the first planetary gear mechanism PG1 and the carrier Cb (the eleventh element) of the second planetary gear mechanism PG2 are connected to constitute a third connecting body Ca-Cb.

In addition, the automatic transmission of the embodiment includes seven engaging mechanisms constituted by three clutches, which are the first to third clutches C1 to C3, three brakes, which are the first to third brakes B1 to B3, and a two-way clutch F1.

The first clutch C1 is a hydraulic operation type and wet type multi-plate clutch, which is configured to be switchable between a connected state in which the sun gear Sc (the first element) of the third planetary gear mechanism PG3 and the third connecting body Ca-Cb are connected and an open state in which the connection is cut.

The third clutch C3 is a hydraulic operation type and wet type multi-plate clutch, which is configured to be switchable between a connected state in which the sun gear Sc (the first element) of the third planetary gear mechanism PG3 and the ring gear Rd (the fourth element) of the fourth planetary gear mechanism PG4 are connected and an open state in which the connection is cut.

The second clutch C2 is a hydraulic operation type and wet type multi-plate clutch, which is configured to be switchable between a connected state in which the sun gear Sd (the sixth element) of the fourth planetary gear mechanism PG4 and the second connecting body Rc-Sb are connected and an open state in which the connection is cut.

The two-way clutch F1, which functions as a fourth brake, is configured to allow normal rotation of the third connecting body Ca-Cb (rotation in a rotational direction of the input shaft 11 and/or the same direction as the rotational direction of the output member 13 upon advancement of the vehicle, and to be switchable between a reverse rotation prevention state in which reverse rotation (in a rotational direction opposite to the normal rotation) is prevented and a fixed state in which the third connecting body Ca-Cb is fixed to the transmission case 10.

When a force attempting rotation in a normal rotational direction is applied to the third connecting body Ca-Cb in the reverse rotation prevention state, the two-way clutch F1 reaches an open state in which rotation is allowed, and when a force attempting rotation in a reverse rotational direction is applied, the two-way clutch F1 reaches a fixed state in which the rotation is prevented and the two-way clutch F1 is fixed to the transmission case 10. In the embodiment, the two-way clutch corresponds to a switching mechanism.

The first brake B1 is a hydraulic operation type and wet type multi-plate brake, which is configured to be switchable between a fixed state in which the sun gear Sa (the seventh element) of the first planetary gear mechanism PG1 is fixed to the transmission case 10 and an open state in which the fixing is released.

The second brake B2 is a hydraulic operation type and wet type multi-plate brake, which is configured to be switchable between a fixed state in which the sun gear Sd (the sixth element) of the fourth planetary gear mechanism PG4 is fixed to the transmission case 10 and an open state in which the fixing is released. The third brake B3 is a hydraulic operation type and wet type multi-plate brake, which is configured to be switchable between a fixed state in which the ring gear Rd (the fourth element) of the fourth planetary gear mechanism PG4 is fixed to the transmission case 10 and an open state in which the fixing is released.

The states of the clutches C1 to C3, the brakes B1 to B3 and the two-way clutch F1 are switched by a transmission control device ECU constituted by a transmission control unit (TCU) shown in FIG. 1 on the basis of vehicle information such as a traveling speed or the like of the vehicle transmitted from an integrated control unit or the like (not shown).

The transmission control device ECU is configured by an electronic unit constituted by a CPU, a memory, and so on (not shown), can receive predetermined vehicle information such as a traveling speed or an accelerator position of the vehicle V, a rotational speed or an output torque of the engine E, and operation information or the like of a paddle shift lever 33, and controls the automatic transmission 3 (a transmission mechanism) by executing a control program held on a storage device such as a memory or the like using a CPU.

As shown in FIG. 1, the paddle shift lever 33 is installed on a handle 31 of the vehicle V of the embodiment, upshifted by a manual operation when a right paddle 33u is pulled toward a driver, and downshifted by a manual operation when a left paddle 33d is pulled toward a driver. An operation signal of the paddle shift lever 33 is transmitted to the transmission control device ECU.

Further, an operation unit for a manual operation is not limited to the paddle shift lever 33 of the embodiment and may be another operation unit, for example, a button disposed on a shift lever or a paddle disposed between a driver's seat and a passenger seat.

As shown in FIG. 2, the first clutch C1, the first planetary gear mechanism PG1, the second planetary gear mechanism PG2, the third planetary gear mechanism PG3, the second clutch C2, the fourth planetary gear mechanism PG4 and the third clutch C3 are sequentially disposed on an axis of the input shaft 11 from the drive source ENG and the torque converter 2 side.

Then, the third brake B3 is disposed at an outer side of the fourth planetary gear mechanism PG4 in a radial direction, the second brake B2 is disposed at an outer side of the second clutch C2 in the radial direction, the first brake B1 is disposed at an outer side of the first clutch C1 in the radial direction, and the two-way clutch F1 is disposed at an outer side of the first planetary gear mechanism PG1 in the radial direction.

In this way, as the three brakes B1 to B3 and the two-way clutch F1 are disposed at the outer side of the planetary gear mechanism or the clutch in the radial direction, reduction in an axial length of the automatic transmission 3 can be achieved in comparison with the case in which the brakes B1 to B3 and the two-way clutch F1 are disposed parallel to the axis of the input shaft 11 together with the planetary gear mechanism and the clutch. Further, the third brake B3 may be disposed at an outer side of the third clutch C3 in the radial direction, and the second brake B2 may be disposed at an outer side of the fourth planetary gear mechanism PG4 in the radial direction.

Next, the case in which gear shifting stages of the automatic transmission 3 of the embodiment are established will be described with reference to FIG. 3 and FIG. 4.

When a first speed stage is established, the two-way clutch F1 is in the reverse rotation prevention state (R in FIG. 4), and the first brake B1 and the second brake B2 are in the fixed state. As the two-way clutch F1 in the reverse rotation prevention state (R) and the first brake B1 is in the fixed state, reverse rotation of the third connecting body Ca-Cb and the sun gear Sa (the seventh element) of the first planetary gear mechanism PG1 is prevented, and a rotational speed of the third connecting body Ca-Cb and the sun gear Sa (the seventh element) of the first planetary gear mechanism PG1 becomes "0."

Accordingly, the transmission is in a locked state in which the three elements, the seventh to ninth elements Sa, Ca and Ra of the first planetary gear mechanism PG1 are not relatively rotatable, and a rotational speed of the first connecting body Cc-Cd-Ra including the ring gear Ra (the ninth element) of the first planetary gear mechanism PG1 also becomes "0." Then, a rotational speed of the ring gear Rb (the tenth element) of the second planetary gear mechanism PG2 to which the output member 13 is connected becomes "$1^{st}$" shown in FIG. 3, and the first speed stage is established.

Further, while it is possible that the first speed stage is established without causing the second brake B2 to be in the fixed state, the second brake B2 is in the fixed stage in the first speed stage such that gear shifting can be smoothly performed from the first speed stage to a second speed stage, which will be described below. In addition, when an engine brake is to be effective in the first speed stage, the two-way clutch F1 is switched from the reverse rotation prevention state (R) to the fixed state (L).

When a second speed stage is established, the two-way clutch F1 is in the reverse rotation prevention state (R), the first brake B1 and the second brake B2 are in the fixed state, and the second clutch C2 is in the connected state. As the two-way clutch F1 is in the reverse rotation prevention state, normal rotation of the third connecting body Ca-Cb is allowed. In addition, as the first brake B1 is in the fixed state, a rotational speed of the sun gear Sa (the seventh element) of the first planetary gear mechanism PG1 becomes "0." In addition, as the second brake B2 is in the fixed state, a rotational speed of the sun gear Sd (the sixth element) of the fourth planetary gear mechanism PG4 becomes "0."

In addition, as the second clutch C2 is in the connected state, a rotational speed of the second connecting body Re-Sb becomes "0" that is the same speed as the rotational speed of the sun gear Sd (the sixth element) of the fourth planetary gear mechanism PG4. Then, a rotational speed of the ring gear Rb (the tenth element) of the second planetary gear mechanism PG2 to which the output member 13 is connected becomes "$2^{nd}$" shown in FIG. 3, and the second speed stage is established.

When a third speed stage is established, the two-way clutch F1 is in the reverse rotation prevention state, the first brake B1 and the second brake B2 are in the fixed state, and the third clutch C3 is in the connected state. As the two-way clutch F1 is in the reverse rotation prevention state, normal rotation of the third connecting body Ca-Cb is allowed. In addition, as the first brake B1 is in the fixed state, a rotational speed of the sun gear Sa (the seventh element) of the first planetary gear mechanism PG1 becomes "0." In addition, as the second brake B2 is in the fixed state, a rotational speed of the sun gear Sd (the sixth element) of the fourth planetary gear mechanism PG4 becomes "0."

In addition, as the third clutch C3 is in the connected state, a rotational speed of the ring gear Rd (the fourth element) of the fourth planetary gear mechanism PG4 becomes "1" that is the same speed as the rotational speed of the sun gear Sc (the first element) of the third planetary gear mechanism PG3 connected to the input shaft 11. Since the rotational speed of the sun gear Sd (the sixth element) of the fourth planetary gear mechanism PG4 is "0" and the rotational speed of the ring gear Rd (the fourth element) is "1," the rotational speed of the carrier Cd (the fifth element), i.e., the rotational speed of the first connecting body Cc-Cd-Ra becomes $k/(k+1)$.

Then, a rotational speed of the ring gear Rb (the tenth element) of the second planetary gear mechanism PG2 to which the output member 13 is connected becomes "$3^{rd}$" shown in FIG. 3, and the third speed stage is established.

When a fourth speed stage is established, the two-way clutch F1 is in the reverse rotation prevention state, the first brake B1 is in the fixed state, and the second clutch C2 and the third clutch C3 are in the connected state. As the two-way clutch F1 is in the reverse rotation prevention state, normal rotation of the third connecting body Ca-Cb is allowed. In addition, as the first brake B1 is in the fixed state, a rotational speed of the sun gear Sa (the seventh element) of the first planetary gear mechanism PG1 becomes "0."

In addition, as the second clutch C2 is in the connected state, the sun gear Sd (the sixth element) of the fourth planetary gear mechanism PG4 and the second connecting body Rc-Sb are rotated at the same speed. Accordingly, the carrier Cc (the second element) and the carrier Cd (the fifth element) are connected and the ring gear Rc (the third element) and the sun gear Sd (the sixth element) are connected between the third planetary gear mechanism PG3 and the fourth planetary gear mechanism PG4, and in the fourth speed stage in which the second clutch C2 is in the connected state, an alignment diagram constituted by four elements can be drawn by the third planetary gear mechanism PG3 and the fourth planetary gear mechanism PG4.

Then, as the third clutch C3 is in the connected state, the rotational speed of the ring gear Rd (the fourth element) of the fourth planetary gear mechanism PG4 and the rotational speed of the sun gear Sc (the first element) of the third planetary gear mechanism PG3 have the same speed of "1" and the rotational speeds of the two elements of the four elements constituted by the third planetary gear mechanism PG3 and the fourth planetary gear mechanism PG4 have the same speed of "1."

Accordingly, the transmission reaches the locked state in which the elements of the third planetary gear mechanism PG3 and the fourth planetary gear mechanism PG4 are not relatively rotatable, and the rotational speeds of all the elements of the third planetary gear mechanism PG3 and the fourth planetary gear mechanism PG4 become "1." Then, the rotational speed of the third connecting body Ca-Cb becomes $h/(h+1)$, the rotational speed of the ring gear Rb (the tenth element) of the second planetary gear mechanism PG2 to which the output member 13 is connected becomes "$4^{th}$" shown in FIG. 3, and the fourth speed stage is established.

When a fifth speed stage is established, the two-way clutch F1 is in the reverse rotation prevention state, the first brake B1 is in the fixed state, and the first clutch C1 and the third clutch C3 are in the connected state. As the two-way clutch F1 is in the reverse rotation prevention state, normal rotation of the third connecting body Ca-Cb is allowed. In addition, as the first brake B1 is in the fixed state, a rotational speed of the sun gear Sa (the seventh element) of the first planetary gear mechanism PG1 becomes "0."

In addition, as the first clutch C1 is in the connected state, the rotational speed of the third connecting body Ca-Cb becomes the same speed of "1" as the rotational speed of the sun gear Sc (the first element) of the third planetary gear mechanism PG3. Then, the rotational speed of the ring gear Rb (the tenth element) of the second planetary gear mechanism PG2 to which the output member 13 is connected becomes "$5^{th}$" shown in FIG. 3, and the fifth speed stage is established.

Further, it is possible that the fifth speed stage is established without causing the third clutch C3 to be in the connected state. However, since the third clutch C3 should be in the connected state in the fourth speed stage and a sixth speed stage, which will be described below, the third clutch C3 is in the connected state even in the fifth speed stage such that a downshift from the fifth speed stage to the fourth speed stage and an upshift from the fifth speed stage to the sixth speed stage, which will be described below, are smoothly performed.

When the sixth speed stage is established, the two-way clutch F1 is in the reverse rotation prevention state, the three clutches, the first to third clutches C1 to C3 are in the connected state. As the two-way clutch F1 is in the reverse rotation prevention state, normal rotation of the third connecting body Ca-Cb is allowed.

In addition, as the second clutch C2 and the third clutch C3 are in the connected state, as described in the fourth speed stage, the elements of the third planetary gear mechanism PG3 and the fourth planetary gear mechanism PG4 are not relatively rotatable, and a rotational speed of the second connecting body Rc-Sb becomes "1." In addition, as the first clutch C1 is in the connected state, a rotational speed of the third connecting body Ca-Cb becomes "1."

Accordingly, the second planetary gear mechanism PG2 is in a locked state in which the carrier Cb (the eleventh element) and the sun gear Sb (the twelfth element) have the same speed of "1," and the elements are not relatively rotatable. Then, a rotational speed of the ring gear Rb (the tenth element) of the second planetary gear mechanism PG2 to which the output member 13 is connected becomes "1" of "$6^{th}$" shown in FIG. 3, and the sixth speed stage is established.

When a seventh speed stage is established, the two-way clutch F1 is in the reverse rotation prevention state, the second brake B2 is in the fixed state, and the first clutch C1 and the third clutch C3 are in the connected state. As the two-way clutch F1 is in the reverse rotation prevention state, normal rotation of the third connecting body Ca-Cb is allowed.

In addition, as the second brake B2 is in the fixed state, a rotational speed of the sun gear Sd (the sixth element) of the fourth planetary gear mechanism PG4 becomes "0." In addition, as the third clutch C3 is in the connected state, a rotational speed of the ring gear Rd (the fourth element) of the fourth planetary gear mechanism PG4 is the same speed of "1" as the rotational speed of the sun gear Sc (the first element) of the third planetary gear mechanism PG3, and a rotational speed of the first connecting body Cc-Cd-Ra including the carrier Cd (the fifth element) of the fourth planetary gear mechanism PG4 becomes k/(k+1).

In addition, as the first clutch C1 is in the connected state, a rotational speed of the third connecting body Ca-Cb is the same speed of "1" as the rotational speed of the sun gear Sc (the first element) of the third planetary gear mechanism PG3 connected to the input shaft 11. Then, a rotational speed of the ring gear Rb (the tenth element) of the second planetary gear mechanism PG2 to which the output member 13 is connected becomes "$7^{th}$" shown in FIG. 3, and the seventh speed stage is established.

When an eighth speed stage is established, the two-way clutch F1 is in the reverse rotation prevention state, the second brake B2 is in the fixed state, and the first clutch C1 and the second clutch C2 are in the connected state. As the two-way clutch F1 is in the reverse rotation prevention state, normal rotation of the third connecting body Ca-Cb is allowed.

In addition, as the second brake B2 is in the fixed state, a rotational speed of the sun gear Sd (the sixth element) of the fourth planetary gear mechanism PG4 becomes "0." In addition, as the second clutch C2 is in the connected state, a rotational speed of the second connecting body Rc-Sb is the same speed of "0" as the rotational speed of the sun gear Sd (the sixth element) of the fourth planetary gear mechanism PG4.

In addition, as the first clutch C1 is in the connected state, the rotational speed of the third connecting body Ca-Cb is the same speed of "1" as the rotational speed of the sun gear Sc (the first element) of the third planetary gear mechanism PG3. Then, a rotational speed of the ring gear Rb (the tenth element) of the second planetary gear mechanism PG2 to which the output member 13 is connected becomes "$8^{th}$" shown in FIG. 3, the eighth speed stage is established.

When a ninth speed stage is established, the two-way clutch F1 is in the reverse rotation prevention state, the second brake B2 and the third brake B3 are in the fixed state, and the first clutch C1 is in the connected state. As the two-way clutch F1 is in the reverse rotation prevention state, normal rotation of the third connecting body Ca-Cb is allowed.

In addition, as the second brake B2 is in the fixed state, a rotational speed of the sun gear Sd (the sixth element) of the fourth planetary gear mechanism PG4 becomes "0." As the third brake B3 is in the fixed state, a rotational speed of the ring gear Rd (the fourth element) of the fourth planetary gear mechanism PG4 also becomes "0." For this reason, the second brake B2 is in the locked state in which the elements Sd, Cd and Rd of the fourth planetary gear mechanism PG4 are not relatively rotatable, and a rotational speed of the first connecting body Cc-Cd-Ra including the carrier Cd (the fifth element) of the fourth planetary gear mechanism PG4 also becomes "0."

In addition, as the first clutch C1 is in the connected state, a rotational speed of the third connecting body Ca-Cb is the same speed of "1" as the rotational speed of the sun gear Sc (the first element) of the third planetary gear mechanism PG3. Then, a rotational speed of the ring gear Rb (the tenth element) of the second planetary gear mechanism PG2 to which the output member 13 is connected becomes "$9^{th}$" shown in FIG. 3, and the ninth speed stage is established.

When a tenth speed stage is established, the two-way clutch F1 is in the reverse rotation prevention state, the third brake B3 is in the fixed state, and the first clutch C1 and the second clutch C2 are in the connected state. As the two-way clutch F1 is in the reverse rotation prevention state, normal rotation of the third connecting body Ca-Cb is allowed.

In addition, as the second clutch C2 is in the connected state, the second connecting body Rc-Sb and the sun gear Sd (the sixth element) of the fourth planetary gear mechanism PG4 are rotated at the same speed. In addition, as the third brake B3 is in the fixed state, a rotational speed of the ring gear Rd (the fourth element) of the fourth planetary gear mechanism PG4 becomes "0." In addition, as, the first clutch C1 is in the connected state, a rotational speed of the third connecting body Ca-Cb is the same speed of "1" as the rotational speed of the sun gear Sc (the first element) of the third planetary gear mechanism PG3. Then, a rotational speed of the ring gear Rb (the tenth element) of the second planetary gear mechanism PG2 to which the output member 13 is connected becomes "$10^{th}$" shown in FIG. 3, the tenth speed stage is established.

When a reverse travel stage is established, the two-way clutch F1 is in the fixed state (L in FIG. 4), the second brake B2 is in the fixed state, and the third clutch C3 is in the connected state. As the second brake B2 is in the fixed state and the third clutch C3 is in the connected state, a rotational speed of the first connecting body Cc-Cd-Ra becomes k/(k+1). In addition, as the two-way clutch F1 is in the fixed state, a rotational speed of the third connecting body Ca-Cb becomes "0." Then, a rotational speed of the ring gear Rb (the tenth element) of the second planetary gear mechanism PG2 to which the output member 13 is connected becomes "Rvs" of a reverse rotation shown in FIG. 3, and the reverse travel stage is established.

Further, a speed line shown by a broken line in FIG. 3 represents that elements of another planetary gear mechanism are rotated (revolved) to follow the planetary gear mechanism, which is configured to transmit power, among the four planetary gear mechanisms PG1 to PG4.

Figures 4, 5:
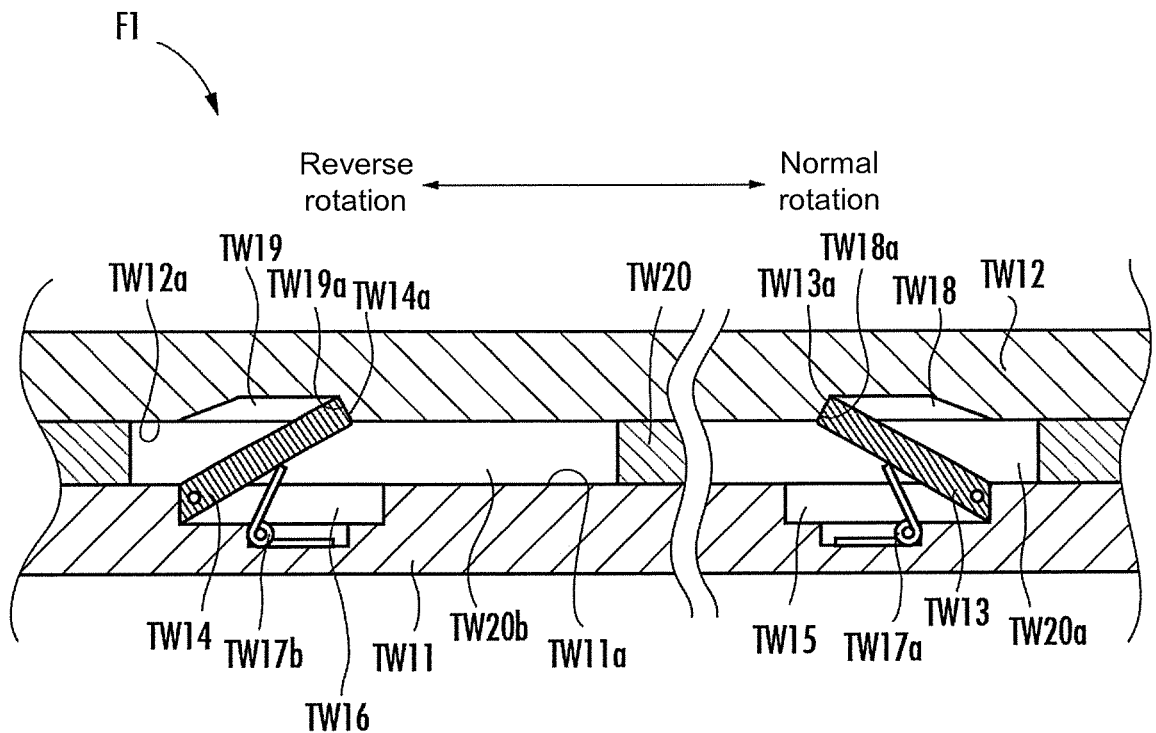
FIG. 4 is a view for describing engaged states of engaging mechanisms in gear shifting stages of the embodiment.
FIG. 5 is a view for describing a cross section of a two-way clutch of the embodiment in a fixed state.

FIG. 4 is a view collectively showing states of the clutches C1 to C3, the brakes B1 to B3 and the two-way clutch F1 in the above-mentioned gear shifting stages, "0" in rows of the three clutches, the first to third clutches C1 to C3, and the three brakes, the first to third brakes B1 to B3 represents a connected state or a fixed state, and a blank represents an open state. In addition, "R" of the row of the two-way clutch F1 shows the reverse rotation prevention state, and "L" shows the fixed state.

In addition, underlined "R" and "L" show that the two-way clutch F1 moves and a rotational speed of the third connecting body Ca-Cb becomes "0." In addition, while "R/L" is "R" of the reverse rotation prevention state during a normal time, the two-way clutch F1 is switched to "L" of the fixed state when the engine brake is to be effective.

In addition, FIG. 4 also shows gear ratios of the gear shifting stages (a rotational speed of the input shaft 11/a rotational speed of the output member 13) and a common ratio (a ratio between gear ratios between the gear shifting stages, a value obtained by dividing a gear ratio of a predetermined gear shifting stage by a gear ratio of a gear shifting stage that is one stage higher than the predetermined gear shifting stage) when a gear ratio h of the first planetary gear mechanism PG1 is 2.681, a gear ratio i of the second planetary gear mechanism PG2 is 1.914, a gear ratio j of the third planetary gear mechanism PG3 is 2.734 and a gear ratio k of the fourth planetary gear mechanism PG4 is 1.614, and accordingly, the common ratio can be appropriately set.

Next, the two-way clutch F1 will be described in detail with reference to FIG. 5 to FIG. 8. The two-way clutch F1 is configured to be switchable between a fixed state in which the third connecting body Ca-Cb is fixed to the transmission case 10 and a reverse rotation prevention state in which normal rotation of the third connecting body Ca-Cb is allowed and reverse rotation is prevented.

Figure 6:
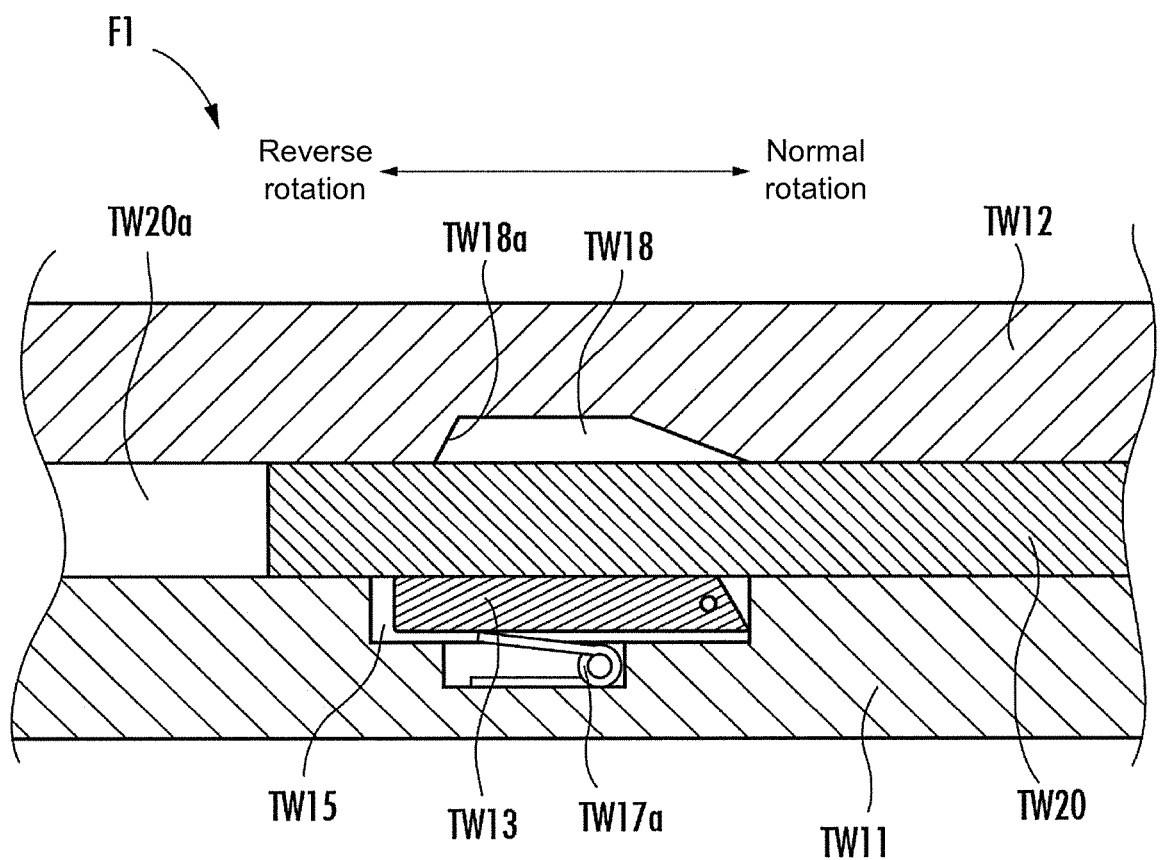
FIG. 6 is a view for describing a cross section of the two-way clutch of the embodiment in a reverse rotation prevention state.
Figure 7:
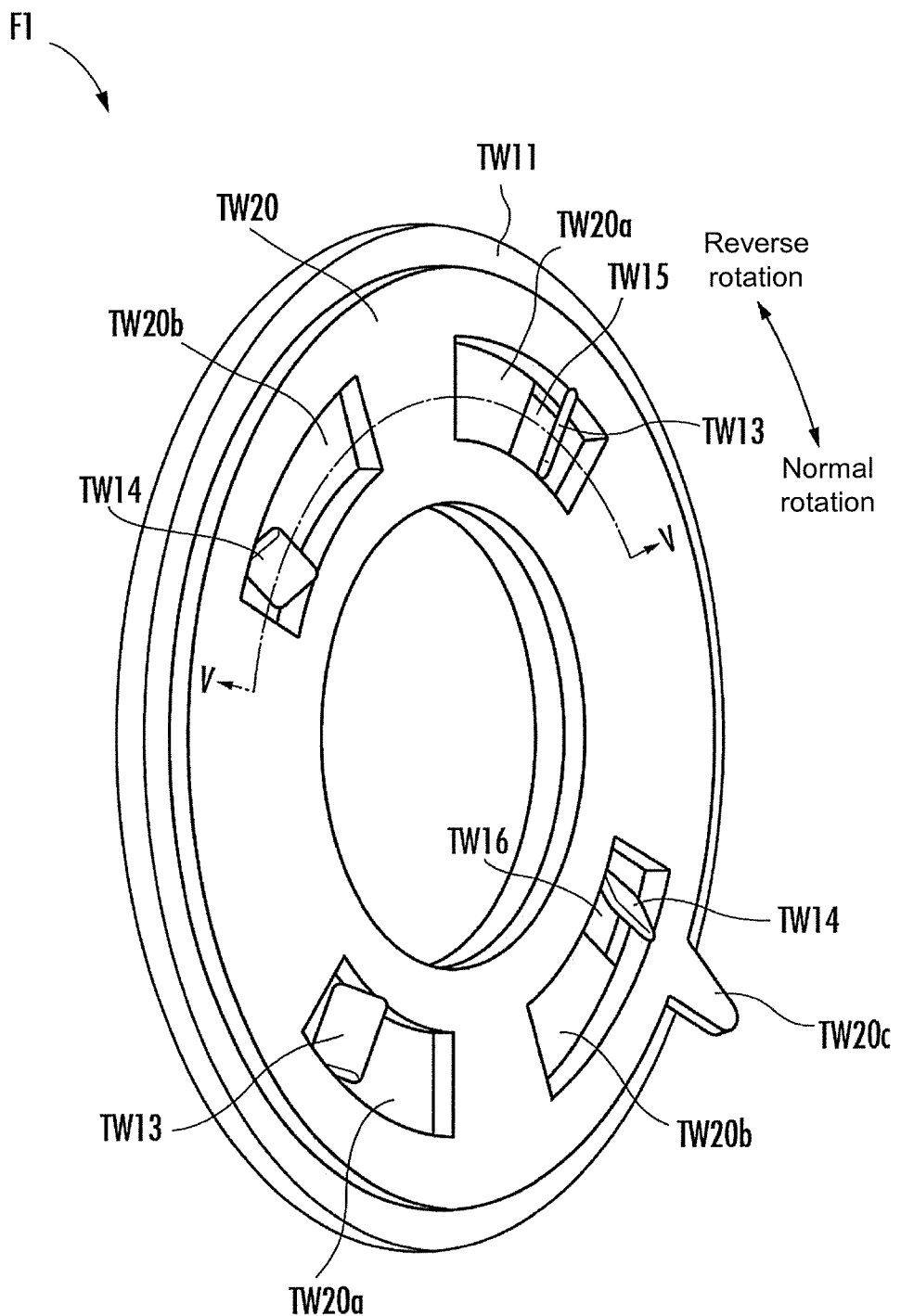
FIG. 7 is a perspective view showing the two-way clutch of the embodiment in the fixed state.

As shown by cross sections in FIG. 5 and FIG. 6, the two-way clutch F1 includes a fixed plate TW11 fixed to the transmission case 10, and a rotating plate TW12. As shown in FIG. 7, the fixed plate TW11 is formed in an annular shape (a doughnut shape). In addition, while not shown in FIG. 7, like the fixed plate TW11, the rotating plate TW12 is also formed in an annular shape (a doughnut shape), and the fixed plate TW11 and the rotating plate TW12 are disposed concentrically.

As shown in FIG. 5, a plate-shaped normal rotation prevention-side swing section TW13 having an end TW13a at the other side in a circumferential direction (a direction in which the rotating plate TW12 is reversely rotated) that swings about an end portion of the fixed plate TW11 at one side in the circumferential direction (in a direction in which the rotating plate TW12 is normally rotated) as a shaft and a plate-shaped anti-reverse-side swing section TW14 having an end TW14a at one side in the circumferential direction (a normal rotational direction) that swings about an end portion of the fixed plate TW11 at the other side in the circumferential direction (a reverse rotational direction) as a shaft are installed on the facing surface TW11a of the fixed plate TW11 that faces the rotating plate TW12.

In addition, accommodating sections TW15 and TW16 that are recessed to accommodate the normal rotation prevention-side swing section TW13 and the anti-reverse-side swing section TW14 are formed in a facing surface TW11a of the fixed plate TW11. Biasing members TW17a and TW17b constituted by springs configured to bias the swing sections TW13 and TW14 are installed on bottom surfaces of the accommodating sections TW15 and TW16 such that the ends TW13a and TW14a, about which the corresponding swing sections TW13 and TW14 swing, protrude from the accommodating sections TW15 and TW16.

Hole sections TW18 and TW19 are formed in a facing surface TW12a of the rotating plate TW12 that faces the fixed plate TW11 at positions corresponding to the swing sections TW13 and TW14. A first engaging section TW18a disposed at the other side of the rotating plate TW12 in the circumferential direction (a side in the reverse rotational direction) and formed in a stage shape to be engageable with the end TW13a about which the normal rotation prevention-side swing section TW13 swings is formed in a first hole section TW18 formed at a position corresponding to the normal rotation prevention-side swing section TW13.

A second engaging section TW19a disposed at one side of the rotating plate TW12 in the circumferential direction (a side in the normal rotational direction) and formed in a stage shape to be engageable with the end TW14a about which the anti-reverse-side swing section TW14 swings is formed in a second hole section TW19 formed at a position corresponding to the anti-reverse-side swing section TW14.

As shown in FIG. 5 and FIG. 7, when the end TW13a of the normal rotation prevention-side swing section TW13 and the first engaging section TW18a are in an engageable state and the end TW14a of the anti-reverse-side swing section TW14 and the second engaging section TW19a are in an engageable state, both of normal rotation and reverse rotation of the rotating plate TW12 are prevented. Accordingly, a state in which the ends TW13a and TW14a and the engaging sections TW18a and TW19a corresponding thereto are engaged with each other becomes a fixed state of the two-way clutch F1 of the embodiment.

A switching plate TW20 is sandwiched between the fixed plate TW11 and the rotating plate TW12. As shown in FIG. 7, the switching plate TW20 is also formed in an annular shape (a doughnut shape). The notch holes TW20a and TW20b are formed in the switching plate TW20 at positions corresponding to the swing sections TW13 and TW14.

Figure 8:
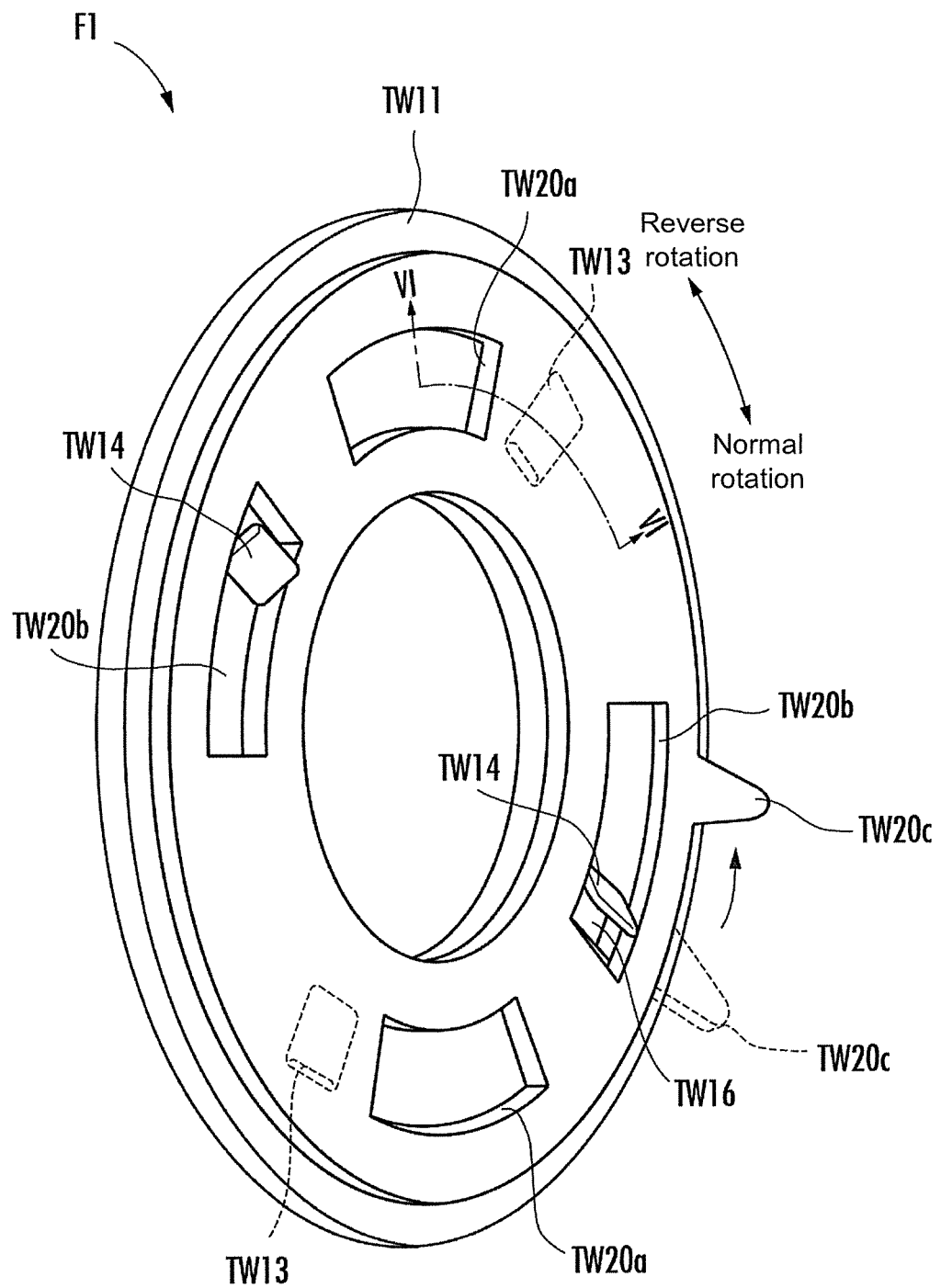
FIG. 8 is a perspective view showing the two-way clutch of the embodiment in the reverse rotation prevention state.

A protrusion TW20c protruding outward in the radial direction is formed on an outer edge of the switching plate TW20. As shown in FIG. 8, the switching plate TW20 is swingable with respect to the fixed plate TW11.

When the switching plate TW20 swings from the fixed state shown in FIG. 7 to a state shown in FIG. 8, as shown in FIG. 6, the first notch hole TW20a corresponding to the normal rotation prevention-side swing section TW13 exceeds the normal rotation prevention-side swing section TW13, and the normal rotation prevention-side swing section TW13 is pressed to the switching plate TW20 and accommodated in the accommodating section TW15 against a biasing force of the biasing member TW17a. Accordingly, engagement between the end TW13a of the normal rotation prevention-side swing section TW13 and the first engaging section TW18a is prevented. Accordingly, rotation of the rotating plate TW12 on a normal rotation side is allowed.

In addition, as shown in FIG. 8, the second notch hole TW20b corresponding to the anti-reverse-side swing section TW14 is configured such that the end TW14a can be engaged with the second engaging section TW19a while the anti-reverse-side swing section TW14 is not accommodated in the accommodating section TW16 even when the switching plate TW20 swings from the fixed state shown in FIG. 7 to the state shown in FIG. 8.

The states shown in FIG. 6 and FIG. 8 become a reverse rotation prevention state of the two-way clutch F1 of the embodiment due to this.

Figure 9:
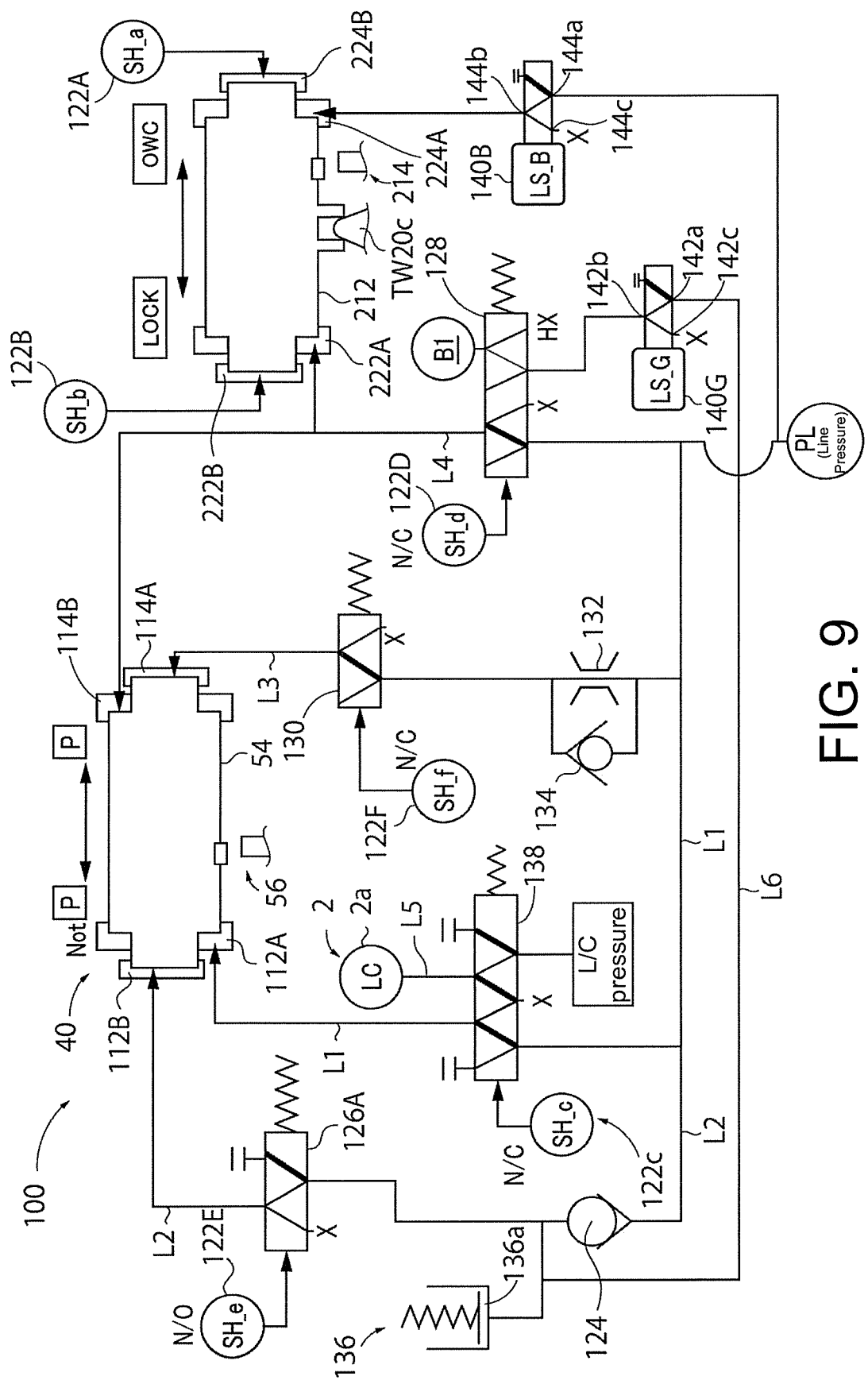
FIG. 9 is a view for describing the hydraulic pressure control device of the embodiment.

Next, a hydraulic pressure control device 100 included in the automatic transmission 3 of the embodiment will be described with reference to FIG. 9. As shown in FIG. 9, the hydraulic pressure control device 100 is configured to control an operation of the parking piston 54 of the parking lock mechanism 40.

The hydraulic pressure control device 100 includes an ON/OFF type solenoid valve 122C configured to supply a line pressure supplied from a hydraulic pump (not shown) to an oil path L1 to a first locking oil chamber 112A, and an ON/OFF type solenoid valve 122E configured to supply a line pressure of an oil path L2 connected to a downstream side of the oil path L1 to a second locking oil chamber 112B. The check valve 124 disposed upstream from the solenoid valve 122E is installed in the oil path L2. While the solenoid valve 122C is opened to directly support a line pressure to the first locking oil chamber 112A, the solenoid valve 122E is opened to open a first ball valve 126A. The solenoid valve 122C is a normally closed type, and the solenoid valve 122E is a normal open type.

In addition, the hydraulic pressure control device 100 includes an ON/OFF type solenoid valve 122F configured to supply a line pressure to a first unlocking oil chamber 114A via an oil path L3, and an ON/OFF type solenoid valve 122D configured to supply a line pressure of an oil path L4 branching off upstream from a check valve 124 to a second unlocking oil chamber 114B.

A line pressure is directly supplied to the second unlocking oil chamber 114B via a brake cut valve 128 operated by the solenoid valve 122D.

The solenoid valve 122F supplies a line pressure to the first unlocking oil chamber 114A as the solenoid valve 122F is opened to move a spool of a parking inhibition valve 130 toward a right side in FIG. 9 against a biasing force of a spring. In contrast, a line pressure of the first unlocking oil chamber 114A is drained as the spool of the parking inhibition valve 130 is biased by the spring to move toward a left side in FIG. 9 due to closing of the solenoid valve 122F. The solenoid valve 122F is a normally closed type, and the solenoid valve 122D is a normally closed type.

A second choke 132 in which a flow path is narrowed is installed upstream from the parking inhibition valve 130 of the oil path L3. The second choke 132 is constituted by a slot groove of a separator plate. In this way, when the second choke 132 is constituted by the slot groove of the separator plate, there is no need to form a separate member for a second choke, reduction in the number of parts can be achieved, and simplification in assembly of the parking lock apparatus can be achieved.

In addition, a second check valve 134 in parallel with the second choke 132 and configured to stop supply of hydraulic pressure to the first unlocking oil chamber 114A and allow release of the hydraulic pressure from the first unlocking oil chamber 114A is installed. Release of the hydraulic pressure can be rapidly performed by installing the second check valve 134.

A pressure accumulating chamber 136a of an accumulator 136 is connected to the oil path L2 between the check valve 124 and the solenoid valve 122E.

A lock-up clutch shift valve 138 is connected to the oil path L1 downstream from the solenoid valve 122C, and a lock-up clutch pressure of an oil path L5 is supplied to a lock-up clutch 2a of the torque converter 2 that is a starting mechanism via the lock-up clutch shift valve 138.

In addition, the first brake B1 that is a hydraulic engaging apparatus for transmission is connected to an oil path L6 downstream from the check valve 124, and the linear solenoid valve 140G and the brake cut valve 128 are disposed in the oil path L6. The brake cut valve 128 is driven by the solenoid valve 122D to be opened or closed. A linear solenoid valve 140G includes an in-port 42a, an out-port 142b and a drain port 142c, and can adjust hydraulic pressure input from the in-port 42a and output the adjusted hydraulic pressure from the out-port 142b, or release the hydraulic pressure from the out-port 142b via the drain port 142c.

In addition, the hydraulic pressure control device 100 includes a two-way piston 212 configured to engage with the protrusion TW20c of the switching plate TW20 of the two-way clutch F1 and switch the switching plate TW20 between a side to be the reverse rotation prevention state and a side to be the fixed state using the hydraulic pressure.

Like the parking piston 54, the two-way piston 212 is accommodated in a cylinder (not shown), and a first oil chamber 222A for anti-reverse rotation and a second oil chamber 222B for anti-reverse rotation configured to move the two-way piston 212 toward the side to be the reverse rotation prevention state ("OWC" in FIG. 9) are installed at one end portion of the two-way piston 212.

A first fixing oil chamber 224A and a second fixing oil chamber 224B configured to move the two-way piston 212 to the side to be the fixed state ("LOCK" in FIG. 9) are installed at the other end portion of the two-way piston 212.

The first oil chamber 222A for anti-reverse rotation is connected to the oil path L4. The line pressure can be supplied to the second oil chamber 222B for anti-reverse rotation via the solenoid valve 122B. The line pressure can be supplied to the first fixing oil chamber 224A via a linear solenoid valve 140B.

The linear solenoid valve 140B includes an in-port 144a, an out-port 144b and a drain port 144c, and can adjust the line pressure input from the in-port 144a to output the adjusted line pressure from the out-port 144b, or release the hydraulic pressure from the out-port 144b via the drain port 144c.

A line pressure can be supplied to the second fixing oil chamber 224B via the solenoid valve 122A.

Next, an action of the embodiment including the configuration will be described.

When a driver selects a D range or an R range using a shift operation unit such as a shift lever or the like and the vehicle travels at a predetermined gear shifting stage, the line pressure generated by a hydraulic pump driven by the internal combustion engine is transmitted to the oil path L1 and the oil path L3, and the hydraulic pressure of the oil path L1 passes through the check valve 124 to be transmitted to the oil path L2, the oil path L4 and the oil path L6. The line pressure is supplied to the oil path L2 and the hydraulic pressure is accumulated in the pressure accumulating chamber 136a of the accumulator 136.

The normally closed type solenoid valve 122F is excited to be opened by electric conduction, and the normally closed type solenoid valve 122D is also excited to be opened by electric conduction. Then, as the spool of the parking inhibition valve 130 is moved toward the right side in FIG. 9 due to opening of the solenoid valve 122F, the line pressure of the oil path L3 is transmitted to the first unlocking oil chamber 114A via the parking inhibition valve 130. In addition, the line pressure of the oil path L4 is transmitted to the second unlocking oil chamber 114B due to opening of the solenoid valve 122D.

Meanwhile, the normally closed type solenoid valve 122C is closed as supply of electric power is stopped, and the normal open type solenoid valve 122E is excited to be closed by electrical conduction. Then, oil in the first locking oil chamber 112A is drained from the solenoid valve 122C due to closing of the solenoid valve 122C, and oil in the second locking oil chamber 112B is drained from the first ball valve 126A as the first ball valve 126A is closed due to closing of the solenoid valve 122E. As a result, the parking piston 54 is moved toward the left side in FIG. 9, and the parking lock is unlocked (a parking released state).

While a flow rate of the oil that is able to pass through the solenoid valve 122E is relatively small, a flow rate of the oil that is able to pass through the first ball valve 126A opened/closed by the solenoid valve 122E is relatively large. For this reason, operation responsiveness of the parking piston 54 can be increased by interposing the first ball valve 126A.

As described above, as the solenoid valve 122C and the solenoid valve 122E are closed and the solenoid valve 122F and the solenoid valve 122D are opened during traveling of the vehicle, the parking piston 54 can be operated at an unlocked position to unlock the parking lock (a parking released state).

In addition, the parking lock mechanism 40 includes two locking oil chambers, that is, the first locking oil chamber 112A and the second locking oil chamber 112B, at one end portion of the parking piston 54, and includes two unlocking oil chambers, that is, the first unlocking oil chamber 114A and the second unlocking oil chamber 114B, at the other end portion. For this reason, even when one of the solenoid valve 122F and the solenoid valve 122D is fixed in a closed state not to supply hydraulic pressure to the first unlocking oil chamber 114A or the second unlocking oil chamber 114B, or even when one of the solenoid valve 122C and the solenoid valve 122E is fixed in an open state to supply hydraulic pressure to the first locking oil chamber 112A or the second locking oil chamber 112B, the parking piston 54 can be operated at an unlocked position (not the P position, in the parking released state) to secure redundancy without difficulty.

Further, the solenoid valve 122F is opened in a first predetermined gear shifting stage, the solenoid valve 122D is opened in a second predetermined gear shifting stage, and the first predetermined gear shifting stage and the second predetermined gear shifting stage partially overlap each other. Accordingly, while the case in which the line pressure is supplied to only the first unlocking oil chamber 114A, the case in which the line pressure is supplied to only the second unlocking oil chamber 114B and the case in which the line pressure is supplied to both of the first unlocking oil chamber 114A and the second unlocking oil chamber 114B are present according to the gear shifting stage established at this time, the parking piston 54 is moved toward the left side in FIG. 9 even in this case and the parking lock is unlocked without difficulty. Then, in the overlapping gear shifting stage, since the line pressure is supplied to both of the first unlocking oil chamber 114A and the second unlocking oil chamber 114B, even when the solenoid valve 122F or the solenoid valve 122D is failed to stop supply of the line pressure, the parking lock is held in an operation unlocked state (the parking released state) to increase redundancy.

When the shift operation unit such as a shift lever or the like is operated to a P range and the vehicle stops while the internal combustion engine is operated, the solenoid valve 122C and the solenoid valve 122E are opened and the solenoid valve 122F and the solenoid valve 122D are closed. The line pressure of the oil path L1 is transmitted to the first locking oil chamber 112A due to opening of the solenoid valve 122C, the first ball valve 126A is opened due to opening of the solenoid valve 122E, and the line pressure of the oil path L2 is transmitted to the second locking oil chamber 112B.

Meanwhile, the working oil in the first unlocking oil chamber 114A is discharged from the parking inhibition valve 130 due to closing of the solenoid valve 122F, and the working oil in the second unlocking oil chamber 114B is discharged from the solenoid valve 122D due to closing of the solenoid valve 122D. As a result, the parking piston 54 is moved toward the right side in FIG. 9 and the parking lock is operated (the parking locked state).

As described above, when a driver selects a P range using the shift operation unit while the internal combustion engine is operated, as the solenoid valve 122C and the solenoid valve 122E are opened and the solenoid valve 122F and the solenoid valve 122D are closed, the parking piston 54 can be operated to a parking lock position. Here, since the parking lock mechanism 40 includes two of the first locking oil chamber 112A and the second locking oil chamber 112B and two of the first unlocking oil chamber 114A and the second unlocking oil chamber 114B, even when one of the solenoid valve 122F and the solenoid valve 122D is fixed in a valve open state to supply hydraulic pressure to the first unlocking oil chamber 114A or the second unlocking oil chamber 114B or even when one of the solenoid valve 122C and the solenoid valve 122E is fixed in a valve closed state not to supply hydraulic pressure to the first locking oil chamber 112A or the second locking oil chamber 112B, the parking piston 54 can be operated to the parking lock position (the P position) without difficulty to secure redundancy (the parking locked state).

When an ignition (a vehicle power supply) is turned ON by operating the shift operation unit to the P range, the line pressure by the pump driven by the internal combustion engine is caused to disappear as the internal combustion engine stops. However, according to the embodiment, the parking lock mechanism 40 can be operated to be in the parking locked state by the hydraulic pressure accumulated in the accumulator 136 without difficulty.

Then, while the hydraulic pressure of the accumulator 136 is transmitted to the second locking oil chamber 112B due to opening of the solenoid valve 122E, the working oil in the first unlocking oil chamber 114A is discharged from the parking inhibition valve 130 due to closing of the solenoid valve 122F and the working oil in the second unlocking oil chamber 114B is discharged from the solenoid valve 122D due to closing of the solenoid valve 122D. As a result, the parking piston 54 is moved toward the right side in FIG. 9 and the parking lock is operated (the parking locked state).

As described above, even when the line pressure is caused to disappear by selecting the P range using the shift operation unit and turning the ignition OFF, the parking lock mechanism 40 can be operated by the hydraulic pressure accumulated in the accumulator 136 without difficulty (the parking locked state).

In addition, the vehicle of the embodiment enables idling stop control, and the pump is also stopped and the line pressure is caused to disappear by stopping the internal combustion engine during temporary halting such as waiting for a traffic light or the like.

Since the line pressure does not generate instantly even when the internal combustion engine is started upon returning from the idling stop control, the hydraulic pressure cannot be supplied to the first brake B1 that is the hydraulic engaging apparatus required for departure, and rapid departure may be prohibited. However, according to the embodiment, the first brake B1 can be operated with the hydraulic pressure in the accumulator 136 held during the idling stop control with no delay.

Describing this in detail, simultaneously with returning from the idling stop control, the hydraulic pressure accumulated in the accumulator 136 is supplied from the oil path L2 to the oil path L6. Here, since the solenoid valve 122D installed in the oil path L4 is opened due to stoppage of supply of electric power, the spool of the brake cut valve 128 is moved toward the left side in FIG. 9. Accordingly, as the linear solenoid valve 140G installed in the oil path L6 is opened to a predetermined opening angle, the hydraulic pressure accumulated in the accumulator 136 can be supplied to the first brake B1, and the vehicle can be rapidly departed.

While an operation of the first brake B1 during returning from the idling stop control has been described in the above-mentioned description, even during conventional traveling of the vehicle, the brake cut valve 128 can be operated by the solenoid valve 122D to control the first brake B1. When the spool of the brake cut valve 128 is moved toward the left side in FIG. 9 and the solenoid valve 122D is closed to block communication between the linear solenoid valve 140G and the first brake B1, while supply of the hydraulic pressure to the second unlocking oil chamber 114B is blocked, since the first brake B1 is held at the unlocked position by the hydraulic pressure supplied to the first unlocking oil chamber 114A, there is no risk that the parking lock will operate (the parking released state).

In addition, according to the embodiment, the solenoid valve 122C is also used for an operation of the lock-up clutch 2a of the torque converter 2. That is, since the solenoid valve 122C is closed during traveling of the vehicle, the spool of the lock-up clutch shift valve 138 is moved toward the right side in FIG. 9, and the lock-up clutch pressure is supplied to the lock-up clutch 2a of the torque converter 2. When the solenoid valve 122C is opened from this state, as the spool of the lock-up clutch shift valve 138 is moved toward the left side in FIG. 9 and the hydraulic pressure of the lock-up clutch 2a is discharged, engagement of the lock-up clutch 2a can be released.

When the solenoid valve 122C is open, while the line pressure is supplied to the first locking oil chamber 112A, since the line pressure is supplied to both of the first unlocking oil chamber 114A and the second unlocking oil chamber 114B at this time, the parking piston 54 is not moved to the parking lock position even if the line pressure is supplied to the first locking oil chamber 112A, and there is no risk that the parking lock will operate.

As described above, according to the parking lock mechanism 40 of the embodiment, since the solenoid valve 122C and the solenoid valve 122D configured to control the operation of the parking piston 54 are used for both of control of the lock-up clutch 2a and control of the first brake B1 of the torque converter 2, the number of solenoid valves can be reduced and a structure of the hydraulic pressure control device 100 can be simplified, and moreover, since the accumulator 136 is not only used for only the operation of the parking lock and is also used for the operation of the first brake B1 that is the hydraulic engaging apparatus upon returning from the idling stop control, the number of accumulators can be reduced and the structure of the hydraulic pressure control device 100 can be further simplified.

The transmission control device ECU combines a function as a control unit of the hydraulic pressure control device 100 with the function thereof. The transmission control device ECU is configured to receive shift switching request information on the basis of the current shift position information and the operation of the operation unit by a driver.

In addition, the transmission control device ECU receives a request instruction signal of parking input. Further, a parking input instruction signal (or a parking input instruction flag) may be output by determining whether the parking input is needed on the basis of predetermined vehicle information such as a traveling speed or the like of the vehicle received by the control unit.

In addition, the transmission control device ECU is configured such that a countdown timer is installed, a numerical value is decremented from a preset initial value, and the passage of time is planned.

In addition, while the transmission control device ECU receives a signal of a stroke sensor 56 installed on the parking piston 54, it is possible to determine whether the parking piston 54 is disposed at the unlocked side, or is disposed on the parking locked side.

Next, an operation of parking-side switching processing of the hydraulic pressure control device 100 of the embodiment when the ranges (the D range, the N range, the R range, and so on) other than the P range are selected will be described with reference to FIG. 10. Further, when the parking-side switching processing in FIG. 10 is performed, as a premise, when a vehicle power supply (an ignition power supply) is turned ON, an initial value is input to a countdown timer, and when processing in FIG. 10 is performed for the first time after the vehicle power supply is turned ON, a numerical value of a countdown timer is set to be reduced as time passes.

First, in STEP 1, it is checked whether a request instruction signal of parking input has been output. When a request has been output, the processing proceeds to STEP 2, and it is checked whether the parking piston 54 is disposed on the parking locked side on the basis of the signal of the stroke sensor 56 of the parking piston 54. When the parking piston 54 is not disposed on the parking locked side, the processing proceeds to STEP 3, and it is checked whether a numerical value of the countdown timer has reduced to "0."

Figure 10:
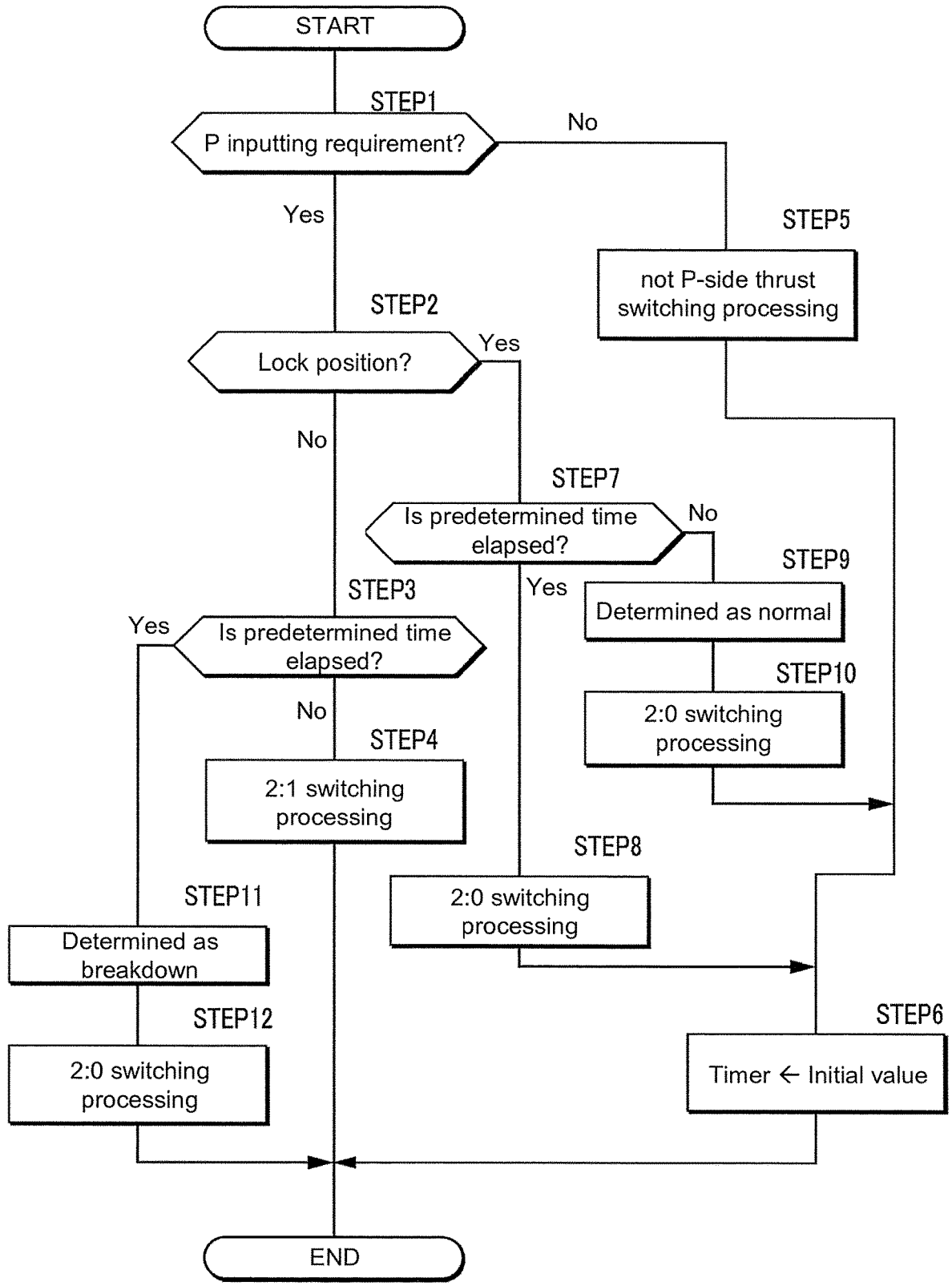
FIG. 10 is a flowchart showing an operation of a control unit of the hydraulic pressure control device of the embodiment.

When the numerical value of the countdown timer has not reduced to "0," the processing proceeds to STEP 4, "P-side thrust 2:1 switching processing" is performed, and the flow of the processing in FIG. 10 of this time is terminated. In the embodiment, the processing in FIG. 10 is repeatedly performed at predetermined control intervals (for example, 10 milliseconds).

As shown in a row of (2) in FIG. 11, "the P-side thrust 2:1 switching processing" stops supply of electric power to the solenoid valve 122C and stops supply of hydraulic pressure to the lock-up clutch shift valve 138 from the normally closed type solenoid valve 122C. Accordingly, the line pressure is supplied to the first locking oil chamber 112A via the lock-up clutch shift valve 138.

In addition, in "P-side thrust 2:1 switching processing," as shown in the row of (2) in FIG. 11, supply of electric power to the solenoid valve 122E is stopped, and hydraulic pressure is supplied from the normal open type solenoid valve 122E to the first ball valve 126A. When the hydraulic pressure is supplied to the first ball valve 126A from the solenoid valve 122E, the line pressure is supplied to the second locking oil chamber 112B via the first ball valve 126A.

In addition, in "P-side thrust 2:1 switching processing," as shown in the row of (2) in FIG. 11, supply of electric power to the solenoid valve 122F is stopped and supply of hydraulic pressure from the normally closed type solenoid valve 122F to an end surface of the spool of the parking inhibition valve 130 is stopped. Accordingly, supply of the hydraulic pressure to the first unlocking oil chamber 114A via the parking inhibition valve 130 is stopped.

In addition, in "the P-side thrust 2:1 switching processing," as shown in the row of (2) in FIG. 11, electric power is supplied to the normally closed type solenoid valve 122D normally closed type which is in an open state. When the solenoid valve 122D is in the open state, the hydraulic pressure is supplied from the solenoid valve 122D to the end portion of the spool of the brake cut valve 128. When the hydraulic pressure is supplied from the solenoid valve 122D to the end portion of the spool of the brake cut valve 128, the spool moves against a biasing force of the spring. Accordingly, the line pressure is supplied to the second unlocking oil chamber 114B via the brake cut valve 128.

Accordingly, in "P-side thrust 2:1 switching processing," the line pressure is supplied to the first locking oil chamber 112A, the second locking oil chamber 112B and the second unlocking oil chamber 114B, and supply of the line pressure to the first unlocking oil chamber 114A is stopped. In the first locking oil chamber 112A, the second locking oil chamber 112B, the first unlocking oil chamber 114A and the second unlocking oil chamber 114B, areas to which the line pressure is applied are set to the same area. Accordingly, when the line pressure is normally supplied to the first locking oil chamber 112A, the second locking oil chamber 112B and the second unlocking oil chamber 114B and supply of the line pressure to the first unlocking oil chamber 114A is normally stopped, the parking piston 54 moves to the parking locked side. In the case where the first and second control valves are regarded as one set and the third and fourth control valves are regarded as another set, "2:1" refers to a situation where both the control valves of one set are ON while one of the two control valves of another set is ON; and "2:0" refers to a situation where both the control valves of one set are ON while none of the two control valves of another set is ON (i.e. both the control valves of another set are OFF).

In STEP 1 in FIG. 10, when a request instruction signal for the parking input has not been output, the processing is branched off to STEP 5, and "not P-side thrust switching processing" is performed. Then, the processing proceeds to STEP 6, the countdown timer is restarted by being returned to an initial value and the flow of the processing in FIG. 10 of this time is terminated.

In "not P-side thrust switching processing" in STEP 5, as shown in a row of (3) in FIG. 11, supply of electric power to the solenoid valve 122C is controlled according to whether the lock-up clutch is fastened or released.

In addition, in "not P-side thrust switching processing," as shown in the row of (3) in FIG. 11, electric power is supplied to the solenoid valve 122E, and supply of the hydraulic pressure from the normal open type solenoid valve 122E to the first ball valve 126A is stopped. When supply of the hydraulic pressure from the solenoid valve 122E to the first ball valve 126A is stopped, supply of the line pressure to the second locking oil chamber 112B via the first ball valve 126A is stopped.

In addition, in "not P-side thrust switching processing," as shown in the row of (3) in FIG. 11, electric power is supplied to the solenoid valve 122F, and hydraulic pressure is supplied from the normally closed type solenoid valve 122F to an end surface of the spool of the parking inhibition valve 130. Accordingly, the hydraulic pressure is supplied to the first unlocking oil chamber 114A via the parking inhibition valve 130.

In addition, in "not P-side thrust switching processing," as shown in the row of (3) in FIG. 11, electric power is supplied to the normally closed type solenoid valve 122D. The normally closed type solenoid valve 122D, to which electricity is allowed to pass, is in an open state. When the solenoid valve 122D is in an open state, the hydraulic pressure is supplied from the solenoid valve 122D to the end portion of the spool of the brake cut valve 128. When the hydraulic pressure is supplied from the solenoid valve 122D to the end portion of the spool of the brake cut valve 128, the spool is moved against the biasing force of the spring. Accordingly, the line pressure is supplied to the second unlocking oil chamber 114B via the brake cut valve 128.

Accordingly, in "not P-side thrust switching processing," the line pressure is supplied to the first unlocking oil chamber 114A and the second unlocking oil chamber 114B, supply of the line pressure to the second locking oil chamber 112B is stopped, and supply of the line pressure to the first locking oil chamber 112A becomes a state dependent on the control of the lock-up clutch. In the first locking oil chamber 112A, the second locking oil chamber 112B, the first unlocking oil chamber 114A and the second unlocking oil chamber 114B, areas, to which the line pressure is applied, are set to the same area.

Accordingly, when the line pressure is normally supplied to the first unlocking oil chamber 114A and the second unlocking oil chamber 114B and supply of the line pressure to the second locking oil chamber 112B is normally stopped, regardless of presence of supply of the line pressure to the first locking oil chamber 112A, the parking piston 54 is maintained on the release side (the parking released state).

In STEP 2 in FIG. 10, when it is checked that the parking piston 54 is disposed on the parking locked side on the basis of the signal of the stroke sensor 56 of the parking piston 54, the processing is branched off to STEP 7, and it is checked whether the numerical value of the countdown timer has reduced to "0."

When the numerical value of the countdown timer has reduced to "0," the processing proceeds to STEP 8, and "P-side thrust 2:0 switching processing" is performed. Then, the processing proceeds to STEP 6, the countdown timer is restarted by being returned to the initial value, and the flow of the processing in FIG. 10 of this time is terminated.

Here, as shown in the row of (1) in FIG. 11, "P-side thrust 2:0 switching processing" in STEP 8 stops supply of electric power to the solenoid valve 122C and stops supply of the hydraulic pressure from the normally closed type solenoid valve 122C to the lock-up clutch shift valve 138. Accordingly, the line pressure is supplied to the first locking oil chamber 112A via the lock-up clutch shift valve 138.

In addition, in "P-side thrust 2:0 switching processing," as shown in the row of (1) in FIG. 11, supply of electric power to the solenoid valve 122E is stopped, and hydraulic pressure is supplied from the normal open type solenoid valve 122E to the first ball valve 126A. When the hydraulic pressure is supplied to the first ball valve 126A from the solenoid valve 122E, the line pressure is supplied to the second locking oil chamber 112B via the first ball valve 126A.

In addition, in "P-side thrust 2:0 switching processing," as shown in the row of (1) in FIG. 11, supply of electric power to the solenoid valve 122F is stopped, and supply of hydraulic pressure from the normally closed type solenoid valve 122F to the end surface of the spool of the parking inhibition valve 130 is stopped. Accordingly, supply of the hydraulic pressure to the first unlocking oil chamber 114A via the parking inhibition valve 130 is stopped.

In addition, in "P-side thrust 2:0 switching processing," as shown in the row of (1) in FIG. 11, supply of electric power to the normally closed type solenoid valve 122D is stopped. The normally closed type solenoid valve 122D that stops supply of the electric power is in a closed state. When the solenoid valve 122D is in the closed state, supply of the hydraulic pressure from the solenoid valve 122D to the end portion of the spool of the brake cut valve 128 is stopped. When supply of the hydraulic pressure from the solenoid valve 122D to the end portion of the spool of the brake cut valve 128 is stopped, the spool is biased by the spring to maintain an initial position. Accordingly, supply of the line pressure to the second unlocking oil chamber 114B via the brake cut valve 128 is stopped.

Accordingly, in "P-side thrust 2:0 switching processing," the line pressure is supplied to the first locking oil chamber 112A and the second locking oil chamber 112B, and supply of the line pressure to the first unlocking oil chamber 114A and the second unlocking oil chamber 114B is stopped. In the first locking oil chamber 112A, the second locking oil chamber 112B, the first unlocking oil chamber 114A and the second unlocking oil chamber 114B, areas to which the line pressure is applied are set to the same area.

Accordingly, even if any one of the first locking oil chamber 112A, the second locking oil chamber 112B, the first unlocking oil chamber 114A and the second unlocking oil chamber 114B is not in a normal line pressure supply state or a normal line pressure stoppage state, the parking piston 54 can be moved to the parking locked side (the parking locked state).

Further, in "P-side thrust 2:0 switching processing" in STEP 8, it is checked whether a reporting processing in the following STEP 11 is performed, and when the reporting processing is not performed, normal determination processing of determining that the solenoid valves 122C to 122F are normal may be performed.

In STEP 7 in FIG. 10, when the numerical value of the countdown timer is not reduced to "0," the processing is branched off to STEP 9, and normal determination processing of determining that the solenoid valves 122C to 122F are normal is performed. Then, the processing proceeds to STEP 10, and "P-side thrust 2:0 switching processing" is performed. Then, the processing proceeds to STEP 6, the countdown timer is restarted by being returned to the initial value, and flow of the processing in FIG. 10 of this time is terminated.

Since "P-side thrust 2:0 switching processing" in STEP 10 is the same as in STEP 8, description thereof will be omitted.

In STEP 3 in FIG. 10, when the numerical value of the countdown timer has reduced to "0" (in the case of "YES" in STEP 3), the processing proceeds to STEP 11, and since it is considered that at least one of the solenoid valves 122C to 122F has failed, a reporting processing of reporting that the valve has failed to a driver using an alarm lamp or the like is performed.

Then, the processing proceeds to STEP 12, "P-side thrust 2:0 switching processing" is performed, and flow of the processing in FIG. 10 of this time is terminated. As shown in a row of (6) in FIG. 11, "P-side thrust 2:0 switching processing" in STEP 12 is the same as "P-side thrust 2:0 switching processing" of STEP 8 in FIG. 10 (processing of the row of (2) in FIG. 11).

In this way, in the hydraulic pressure control device of the embodiment, first, when "P-side thrust 2:1 switching processing" of STEP 4 ((2) in FIG. 11) is performed and the processing is not switched to parking lock even if a predetermined time has elapsed (the countdown timer becomes "0"), "P-side thrust 2:0 switching processing" in STEP 12 is performed. Accordingly, when the processing is not switched to the parking lock even if a predetermined time has elapsed (the countdown timer becomes "0" after "P-side thrust 2:1 switching processing" in STEP 4 (2) in FIG. 11), in the reporting processing of STEP 11, it is possible to detect that any one of the solenoid valves 122C to 122F has failed. Accordingly, in STEP 11, as the breakdown state is reported to a driver using the alarm lamp or the like, the driver can be prompted to perform repair before there is a state in which parking locking is not possible.

Hereinabove, while detection of breakdown of the solenoid valves 122C to 122F that operate the parking piston 54 has been described, similarly, the processing can also be similarly applied to detection of breakdown of the solenoid valves 1A, 122B and 122D and the linear solenoid valve 140G that operate the two-way piston 212 for the two-way clutch F1 that switches between the reverse prevention state and the fixed state of the two-way clutch F1.

In addition, while execution of detection of breakdown upon switching control to the P range has been described in the embodiment, the hydraulic pressure control device of the embodiments of the invention is not limited thereto. For example, the breakdown may be detected and reported to the driver when the processing is switched to the parking released state from the parking locked state in which the range is switched from the P range to another range (the D range or the R range).

In addition, while the embodiment of the invention has been described, various design changes may be made without departing from the spirit of the embodiments of the invention.

For example, the number of the opening/closing valves (the second solenoid valve and the third solenoid valve) of the embodiments of the invention is not limited to the two of the solenoid valve 122C and the solenoid valve 122E of the embodiment, and the number may be one or three or more.

In addition, the number of the solenoid valves for unlocking (the first solenoid valves) is not limited to the two of the solenoid valve 122F and the solenoid valve 122D of the embodiment and the number thereof may be one or three or more.

In addition, while the solenoid valve 122C functions as a solenoid valve configured to supply hydraulic pressure to the lock-up clutch 2a of the torque converter 2 in the embodiment, the solenoid valve 122E may function as the solenoid valve, or the solenoid valve 122C (or the solenoid valve 122E) may function as a solenoid valve configured to supply hydraulic pressure to a hydraulic engaging apparatus. That is, the solenoid valve 122C or the solenoid valve 122E may function as a solenoid valve configured to supply hydraulic pressure to a starting mechanism or a solenoid valve configured to supply hydraulic pressure to any one of a plurality of hydraulic engaging apparatuses.

In addition, the embodiments of the invention are not limited to the torque converter 2 of the embodiment and may be another departure mechanism such as a departure clutch or the like.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hydraulic pressure control device, comprising:
    a piston configured to switch between a first state and a second state;
    two control valves, which are a first control valve and a second control valve configured to supply hydraulic pressure that presses the piston toward a first side that is to be the first state to the piston;
    two control valves, which are a third control valve and a fourth control valve configured to supply hydraulic pressure that presses the piston toward a second side that is to be the second state to the piston; and
    a control unit configured to control the four control valves, which are the first to fourth control valves,
    wherein when a state is switched from the second state to the first state, the control unit performs 2:1 control processing to supply hydraulic pressure to the piston using the three control valves, which are the first to third control valves and to stop the fourth control valve to supply hydraulic pressure to the piston, and when the piston is not switched from the second side at which the piston is in the second state to the first side at which the piston is in the first state through the 2:1 control processing, the control unit performs 2:0 control processing to supply hydraulic pressure to the piston using the two control valves, which are the first and second control valves, and to stop the two control valves, which are the third and fourth control valves to supply hydraulic pressure to the piston, and performs a reporting processing of reporting that at least one of the four control device, which are the first to fourth control valves has failed.

2. The hydraulic pressure control device according to claim 1, wherein the piston is a parking piston configured to switch between a parking locked state and a parking released state of a parking lock mechanism, and the first state is one of the parking locked state and the parking released state, and the second state is the other of the parking locked state and the parking released state.

3. The hydraulic pressure control device according to claim 1, wherein the piston is a two-way piston configured to switch between a reverse rotation prevention state and a fixed state of a two-way clutch, and the first state is one of the reverse rotation prevention state and the fixed state, and the second state is the other of the reverse rotation prevention state and the fixed state.

* * * * *